United States Patent
Toubia et al.

(10) Patent No.: US 12,022,849 B2
(45) Date of Patent: *Jul. 2, 2024

(54) METHODS AND SYSTEMS FOR PRODUCING LOW SUGAR BEVERAGES

(71) Applicant: BLUE TREE TECHNOLOGIES LTD., Tel Aviv (IL)

(72) Inventors: Didier Toubia, Raanana (IL); Asher Vitner, Jerusalem (IL); Revital Mali, Jerusalem (IL); Zach Barnea, Jerusalem (IL)

(73) Assignee: BLUE TREE TECHNOLOGIES LTD., Tel Aviv (IL)

( * ) Notice: Subject to any disclaimer, the term of this patent is extended or adjusted under 35 U.S.C. 154(b) by 139 days.

This patent is subject to a terminal disclaimer.

(21) Appl. No.: 16/766,918

(22) PCT Filed: Nov. 28, 2018

(86) PCT No.: PCT/IB2018/059409
§ 371 (c)(1),
(2) Date: May 26, 2020

(87) PCT Pub. No.: WO2019/106564
PCT Pub. Date: Jun. 6, 2019

(65) Prior Publication Data
US 2021/0015127 A1    Jan. 21, 2021

Related U.S. Application Data

(60) Provisional application No. 62/591,566, filed on Nov. 28, 2017.

(51) Int. Cl.
*A23L 2/80*    (2006.01)
*A23L 2/02*    (2006.01)
(Continued)

(52) U.S. Cl.
CPC ............... *A23L 2/80* (2013.01); *A23L 2/02* (2013.01); *A23L 2/72* (2013.01); *B01D 15/125* (2013.01);
(Continued)

(58) Field of Classification Search
CPC ... A23L 2/06; A23L 2/04; A23L 33/20; A23L 2/80; A23L 2/02; A23L 2/72;
(Continued)

(56) References Cited

U.S. PATENT DOCUMENTS

| 4,471,114 A | 9/1984 | Sherman et al. |
| 4,475,954 A | 10/1984 | Kulprathipanja |

(Continued)

FOREIGN PATENT DOCUMENTS

| GB | 2407573 A | 5/2005 |
| WO | 2004054713 A1 | 7/2004 |

(Continued)

OTHER PUBLICATIONS

Pito et al., (2012) Hydrolysis of sucrose over composite catalysts. Chemical Engineering Journal 184: 347-351.
(Continued)

*Primary Examiner* — Vera Stulii
(74) *Attorney, Agent, or Firm* — BROWDY AND NEIMARK, PLLC

(57) ABSTRACT

Methods and systems are disclosed for selectively removing naturally-occurring sugars in beverages in an effective, affordable and scalable manner.

11 Claims, 20 Drawing Sheets

(51) Int. Cl.
*A23L 2/72* (2006.01)
*B01D 15/12* (2006.01)
*B01D 15/20* (2006.01)
*B01D 21/26* (2006.01)
*B01J 20/18* (2006.01)
*B01J 20/28* (2006.01)
*B01J 20/282* (2006.01)
*B01J 20/32* (2006.01)
*B01J 20/34* (2006.01)

(52) U.S. Cl.
CPC ......... *B01D 15/203* (2013.01); *B01D 21/262* (2013.01); *B01J 20/18* (2013.01); *B01J 20/28052* (2013.01); *B01J 20/282* (2013.01); *B01J 20/3238* (2013.01); *B01J 20/3293* (2013.01); *B01J 20/3408* (2013.01); *B01J 20/3483* (2013.01); *A23V 2002/00* (2013.01)

(58) Field of Classification Search
CPC .... B01J 20/3408; B01J 20/22; B01J 20/3238; B01J 20/282; B01J 47/014; B01J 20/3483; B01J 20/3293; B01J 20/18; B01J 20/28052; B01D 21/262; B01D 15/125; B01D 15/203
See application file for complete search history.

(56) References Cited

U.S. PATENT DOCUMENTS

| | | | |
|---|---|---|---|
| 5,403,604 | A | 4/1995 | Black, Jr. |
| 5,888,306 | A | 3/1999 | Durand et al. |
| 9,220,291 | B2 | 12/2015 | Subramaniam |
| 9,241,509 | B2 | 1/2016 | Subramaniam |
| 2008/0081096 | A1 | 4/2008 | Subramaniam |
| 2011/0165310 | A1 | 7/2011 | Blase |
| 2016/0165944 | A1 | 6/2016 | Zavrel |
| 2016/0213049 | A1* | 7/2016 | O'Connor .............. B01J 20/186 |

FOREIGN PATENT DOCUMENTS

| | | |
|---|---|---|
| WO | 2008039646 A2 | 4/2008 |
| WO | 2014161998 A1 | 10/2014 |

OTHER PUBLICATIONS

Souci et al., (2015) "Apple juice". In: "Food Composition and Nutrition Tables". Jan. 1, 2015 (Jan. 1, 2015), MedPharm, pp. 1098-1099.
BecR2400: "Apfelschorle", Jan. 1, 2009 (Jan. 1, 2009), pp. 1-3. Retrieved from the Internet: URL: https://www.food.com/recipe/apfelschorle-german-apple-spritzer-367587/#activity-feed. Retrieved on Jul. 27, 2021.
Buttersack and Laketic (1994) Hydrolysis of sucrose by dealuminated Y-zeolites. Journal of Molecular Catalysis 94(3): L283-L290.
Fornefett et al., (2016) Adsorption of sucrose on zeolites. Green Chem 18: 3378-3388.
Husiatynska et al., (2018) Research Into Application of Zeolite for Purification of Diffusion Juice in Sugar Production. Eastern-European Journal of Enterprise Technologies 5(11): 6-13.
Moreau et al., (2000) Hydrolysis of sucrose in the presence of H-form zeolites. Industrial Crops and Products 11: 237-242.
Orange Book Chapter 2: Orange juice quality and categories. Retrieved from: https://web.archive.org/web/20181020174819/http://orangebook.tetrapak.com/chapter/orange-juice-quality-and-categories, on Jan. 24, 2019. 10 pages.
C. Buttersack et al., "Specific Adsorption of Saccharides by Dealuminated Y-Zeolites", J. Phys. Chem., 1993, 97, 1181-11864.
Tsutsumi et al., Adsorption characteristics of hydrophobic zeolites, ScienceDirect, 83:217-224 (1994).

* cited by examiner

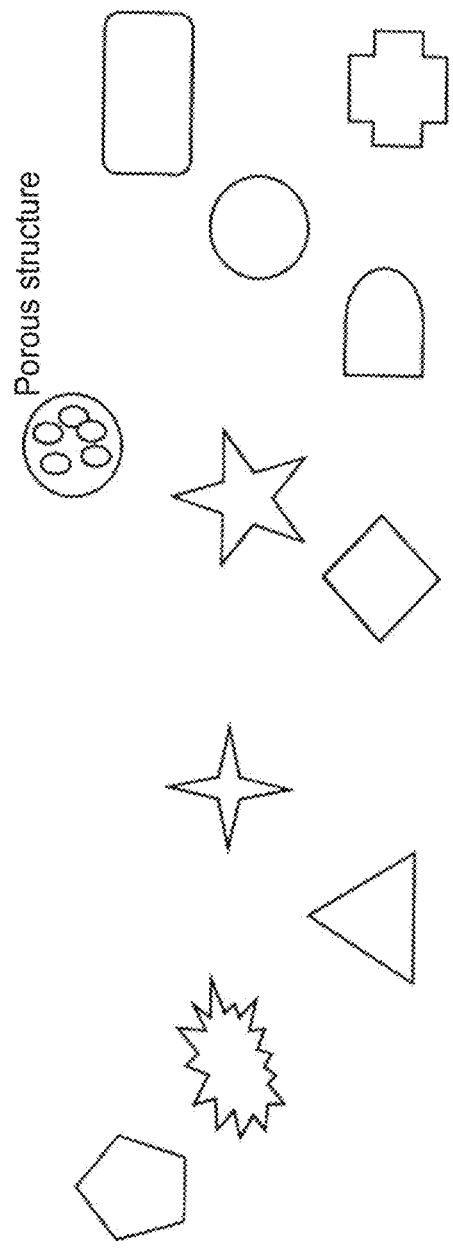

FIG. 2

Chromatographic Separation Resin Technology

| Chromatography Resin | Product Feature | Typical Applications | Separator Screen Size (μm) | Ionic Forms |
|---|---|---|---|---|
| DOWEX MONOSPHERE*99/350 | Low Pressure Drop | Beet Sugar | 175 | K |
| DOWEX MONOSPHERE 99/320 | Standard "Workhorse" Product | HFCS, Beet Sugar, Dextrose | 160 | Ca, K |
| DOWEX MONOSPHERE 99/310 | Reduced Operation Costs | HFCS, Sugar Alcohols, Beet Sugar | 155 | Ca, K |
| DOWEX MONOSPHERE 99/280 | Difficult Separations, Reduced Separator Water Usage | HFCS Sugar Alcohols, High Purity Fructose, Polyols | 140 | Ca, K |
| DOWEX MONOSPHERE 99/220 | Exceptional Performance in Shallow-Bed Separators, Operating Cost Reduction | High Purity Fructose, Sugar Alcohols, Polyols, Difficult to Separate and High Value Sweeteners | 110 | Ca |

FIG. 3

| Applications | Resin | Type | Ionic Forms |
|---|---|---|---|
| Deashing | DOWEX MONOSPHERE*7 | High-Capacity Weak Base Anion | Free Base |
| | DOWEX MONOSPHERE 66 | Weak Base Anion | Free Base |
| | DOWEX 66 | Weak Base Anion | Free Base |
| | DOWEX MONOSPHERE 88 | Strong Acid Cation | H, Na |
| | DOWEX 88 | Strong Acid Cation | H, Na |
| General Decolorization | DOWEX OPTIPORE* SD-2 | Adsorbent | Free Base |
| Beet thin Juice Softening | DOWEX MAC -3 | Weak Acid Cation | H |
| | DOWEX FPC16UPS Na | Strong Acid Cation | Na |
| HFCS Cromatography | DOWEX MONOSPHERE 99 Ca/220 | Strong Acid Cation | Ca |
| | DOWEX MONOSPHERE 99 Ca/280 | Strong Acid Cation | Ca |
| | DOWEX MONOSPHERE 99 Ca/310 | Strong Acid Cation | Ca |
| | DOWEX MONOSPHERE 99 Ca/320 | Strong Acid Cation | Ca |
| Beet and Size Exclusion Chromatography | DOWEX MONOSPHERE 99 K/280 | Strong Acid Cation | K |
| | DOWEX MONOSPHERE 99 K/310 | Strong Acid Cation | K |
| | DOWEX MONOSPHERE 99 K/320 | Strong Acid Cation | K |
| | DOWEX MONOSPHERE 99 K/360 | Strong Acid Cation | K |
| Mixed Bed Polishing | DOWEX MONOSPHERE 22 | Strong Acid Cation | OH, Cl |
| | DOWEX 22 | Strong Acid Cation | OH, Cl |
| | DOWEX MONOSPHERE 88 | Strong Acid Cation | H, Na |
| | DOWEX 88MB | Strong Acid Cation | H, Na |
| Cane Sugar Decolorization | AMBERLITE-FPA98 Cl | Strong Acid Cation | Cl |
| | AMBERLITE FPA90 Cl | Strong Acid Cation | Cl |
| | AMBERLITE FPA900UPS Cl | Strong Acid Cation | Cl |
| Organics Removal | AMBERLITE XAD*761 | Adsorbent | - |

FIG. 3 Continued

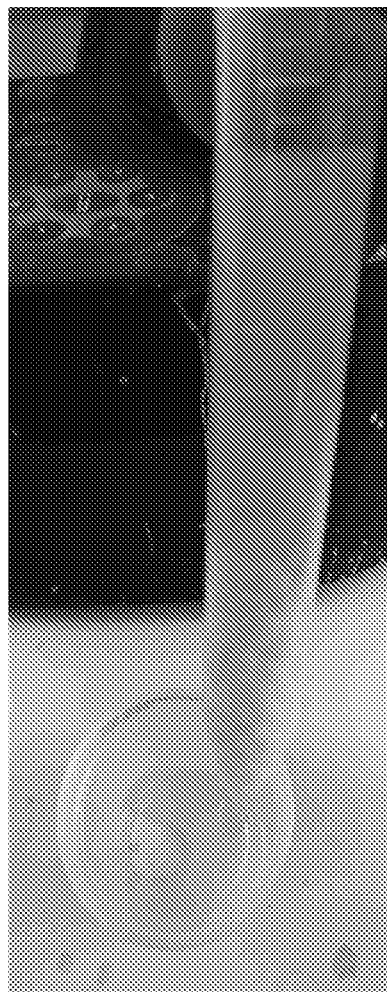 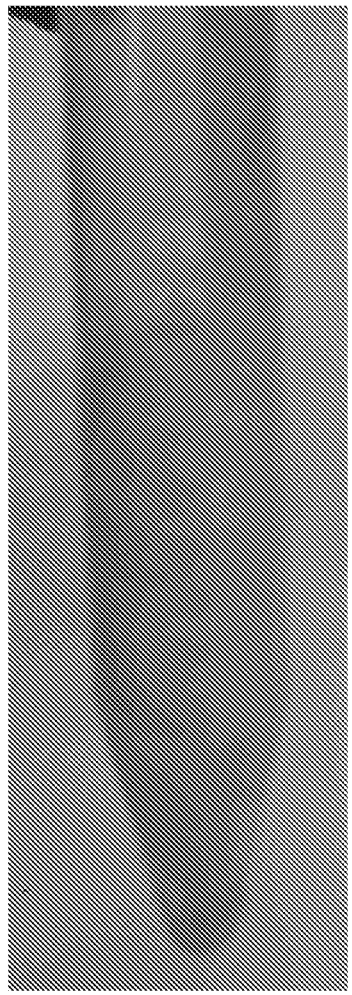
A　　　　　　　　　　B
FIG. 16

METHODS AND SYSTEMS FOR PRODUCING LOW SUGAR BEVERAGES

CROSS REFERENCES TO RELATED APPLICATIONS

The present invention is related to and claims priority from commonly owned U.S. Provisional Patent Application Ser. No. 62/591,566, entitled: Methods and Devices for Producing Low Sugar Beverage, filed on Nov. 28, 2017, the disclosure of which is incorporated by reference in its entirety herein

TECHNICAL FIELD

The present invention is related to treating beverages (drinkable liquids—per Merriam Webster) to reduce the sugar content therein by removing naturally-occurring sugars found in the beverage in its original and untreated form.

BACKGROUND

The global fruit juice market has grown at a compound annual growth rate (CAGR) of around 1.6% during 2009-2016, reaching a volume of around 44 Billion Liters in 2016. Fruit juice is a liquid that is naturally originated from fruits. It is extracted by mechanically squeezing or macerating the fruits. It is commonly consumed as a beverage or used as an ingredient or flavoring agent in foods. Owing to its refreshing nature and nutritional benefits, the fruit juice market currently represents a multibillion dollar industry. According to an IMARC Group report, titled "Fruit Juice (Orange Juice) Market—Global Industry Trends, Share, Size, Growth, Opportunity and Forecast 2017-2022", the market is further expected to grow at a CAGR of 2% during 2017-2022, reaching a volume of around 49 billion liters by 2022. Orange and apple juices represent together approximately 55% of the global market for fruit juices (Global Industry Analysis, 2015).

One common consumer motivation to prefer fruit juices over other sodas or soft drinks is their natural origin and perceived health benefits (i.e., vitamins, minerals, nutritional fibers, etc.). However, fruit juices present a high sugar concentration, typically 8-10 grams of sugars per 100 ml. Sugars found in natural juices typically include sucrose, fructose and glucose. Major concerns associated with high sugar consumption are obesity—associated with significant public health issues both in developed and developing countries, including diabetes and malnutrition.

The beverage industry is under pressure to reduce sugar in beverages, as high sugar beverages, such as soda and juices, pose long term health risks. This is especially true with fruit and vegetable juices, for although perceived to be healthy, are also high in sugar.

While low and reduced sugar fruit beverages are on the market, these beverages are either mixes of juices with other drinks (i.e., coconut water), of juices diluted with water, with low-calorie sweeteners typically added. These products do not present the same sensory and nutritional characteristics as natural juices and require a list of additives to reproduce the juice experience.

Additionally, there had been attempts to reduce sugar in juices by means of resins, which are not specific to sugars. As a result, such sugar reduction processes change the acidity, taste, smell, and sometimes color of the juice, giving a different sensory experience for the juice. Accordingly, these contemporary sugar reduction treatments of juices result in treated juices that are not as preferred as the regular, untreated, juices.

Other sugar reduction processes for juices use chemical methods, such as adding enzymes when processing the juice, to make the sugars non-digestible, or use non-alcoholic fermentation, often causing a significant change in the juice environment. Other sugar reduction processes use expensive filtration systems, such as ultrafiltration or reverse osmosis filters, which are not specifically designed for removing sugars. As a result, these processes negatively impact the sensory and nutritional characteristics of the treated juice. Additionally, some of these processes are expensive to the point that they are not practical on a commercial scale.

Other beverages naturally rich in sugars include milk, typically including 3.5 to 5.5 g of lactose per 100 ml. In addition to the nutritional issues associated with the amount of sugar in milk, some consumers are intolerant or allergic to lactose. The only lactose-free or reduced-lactose milk in the market are achieved by enzymatically hydrolyzing the lactose and obtaining glucose and galactose as a result of the hydrolysis.

SUMMARY

The present invention provides methods and systems to selectively remove naturally-occurring sugars in beverages in an effective, affordable and scalable manner.

The present invention provides methods and systems for removing naturally-occurring sugar and producing low sugar and sugar free beverages, while aiming at maintaining the natural origin of the beverage and its sensory and nutritional characteristics.

The present invention provides methods (processes) and systems for removing sugars from a complex high-sugar content liquid such as a beverage in a substantially selective manner, without mixing any non-natural chemical substance to it or without significantly changing its chemical composition, other than removing sugar molecules and possibly organic acids.

Embodiments of the invention are directed to methods and systems for obtaining low sugar natural fruit juice, mainly orange juice or apple juice, either not from concentrate (NFC) or from concentrate (FC). The invention may be adapted to other vegetable and fruit juice, and to other beverages such as milk. In the case of milk and other dairy beverages, the sugar to be removed, is lactose.

Embodiments of the present invention are such that the disclosed methods and systems capture sugar molecules from a naturally high-sugar content beverage (preferably a poly- or disaccharide such as sucrose, lactose molecules) by a combination of non-covalent bonds and structure recognition with sugar receptors attached to or integrated into a carrier such as beads, granules. microfibers, microtubes, high-porosity scaffold or any other device presenting a large contact surface related to the liquid volume. In some embodiments, some organic acids are also removed, in order to maintain the sensory balance of the beverage (i.e., juice).

Embodiments of the present invention are such that sugar content is reduced or eliminated from a complex high-sugar content liquid such as a fruit or vegetable juice, or milk, or any other beverage without mixing any non-natural chemical substance to it or without significantly changing its chemical composition, other than removing sugar molecules and possibly organic acids.

Embodiments of the present invention are directed to methods and systems for obtaining low sugar natural fruit juice, typically orange juice or apple juice, either not from concentrate (NFC) or from concentrate (FC). The disclosed methods and systems may also be used for treating, e.g., reducing sugar, in juice concentrate, vegetable juices and other beverages, such as milk. With milk, the sugars to be removed include, for example, at least one of lactose and galactose.

In this document, all mentions to juices, including orange juice, are exemplary only, to describe the invention, and are not limiting in any way.

The present invention is such that it allows for reducing the sugar content in the beverage typically by 15% to 75% without significantly impacting the beverage sensory and nutritional value beyond sugar reduction. Implementation of the present invention typically results in a 30-50% sugar reduction in the end product. The methods, devices and systems explained in the present invention may be incorporated at any stage of a juice manufacturing process: for instance, before or between any of the filtration, batch preparation, pasteurization, filling and containerizing, including bottling, steps. In case of juices, the sugar removal process is typically implemented after the pulp separation/centrifugation, filtration or enzymatic process on a clear juice. In case of concentrated juice of any kind, the sugar-removal process may also be implemented either before or after the juice concentration or reconstitution, or on the concentrated juice.

Embodiments of the invention are directed to a method of lowering the sugar content of beverages. The method comprises: contacting a first adsorbent with a beverage, the first adsorbent being active so as to have selectivity for polysaccharides, to treat the beverage and obtain a treated beverage; hydrolyzing the polysaccharides bound to the first adsorbent into monosaccharides after the beverage has contacted the first adsorbent; and, washing the first adsorbent with a solution to remove the hydrolyzed monosaccharides.

Optionally, the method is such that the selectivity for polysaccharides of the first adsorbent is based on a combination of non-covalent bonds and polysaccharide structure matching with the microstructure of the first adsorbent.

Optionally, the method is such that the first adsorbent being active so as to have selectivity for polysaccharides includes the first adsorbent being active so as to have selectivity for disaccharides.

Optionally, the method is such that the disaccharides include at least one of sucrose or lactose.

Optionally, the method is such that the monosaccharides include one or more of fructose, glucose, and galactose.

Optionally, the method is such that the first adsorbent is in a column.

Optionally, the method is such that the first adsorbent includes zeolite.

Optionally, the method is such that the zeolite is selected from zeolites including a Si/Al molar ratio of at least 5:1.

Optionally, the method is such that the zeolite is selected from zeolites including a Si/Al molar ratio of at least 10:1.

Optionally, the method is such that the zeolite includes at least one of: Y Zeolite, Y Zeolite H+, Y Zeolite Na, Y Zeolite K, or, Y Zeolite Ca.

Optionally, the method is such that the first adsorbent includes an inorganic ion exchanger.

Optionally, the method is such that the inorganic ion exchanger includes zeolite.

Optionally, the method is such that the first adsorbent additionally includes an organic ion exchanger.

Optionally, the method is such that the organic ion exchanger includes resin.

Optionally, the method is such that the first adsorbent is associated with a carrier.

Optionally, the method is such that the carrier includes beads.

Optionally, the method is such that the beads are of approximately 1 millimeter to approximately 15 millimeters in diameter.

Optionally, the method is such that the first adsorbent is embedded into the beads.

Optionally, the method is such that the first adsorbent includes zeolite.

Optionally, the method is such that the zeolite is a powder.

Optionally, the method is such that the beads include at least one of: a food grade material.

Optionally, the method is such that the food grade material includes at least one of: hydrogels, organic resins, glass, polymers, carbons, and, ceramics.

Optionally, the method is such that hydrogels includes an alginate.

Optionally, the method is such that the beads are of a porous material.

Optionally, the method is such that the beads include a non-porous material coated with a material of the first adsorbent.

Optionally, the method is such that the material of the first adsorbent includes zeolite powder.

Optionally, the method is such that the carrier includes at least one of fibers and tubes.

Optionally, the method is such that the first adsorbent includes material coated onto the surfaces of the fibers and the tubes.

Optionally, the method is such that the first adsorbent material includes zeolite powder.

Optionally, the method is such that the zeolite includes granules.

Optionally, the method is such that the granules are approximately 1 mm to approximately 15 mm in diameter.

Optionally, the method is such that the zeolite granules are supported by a column.

Optionally, the method is such that the beads or granules include pores of approximately 0.1 micrometers (µm) to approximately 100 µm in diameter.

Optionally, the method is such that the first adsorbent includes ion exchange media.

Optionally, the method is such that the ion exchange media includes at least one of: zeolite, resin and combinations of zeolite and resin.

Optionally, the method is such that the hydrolyzing is performed by at least one of: activating catalytic properties of the first adsorbent by heating the first adsorbent; and treating the first adsorbent with an enzyme.

Optionally, the method is such that the heating the first adsorbent is to at least approximately 40 Degrees Celsius.

Optionally, the method is such that the heating the first adsorbent is to at least approximately 55 Degrees Celsius.

Optionally, the method is such that the heating the first adsorbent is to at least approximately 60 Degrees Celsius.

Optionally, the method is such that the heating the first adsorbent is to at least approximately 70 Degrees Celsius.

Optionally, the method is such that the enzyme includes Invertase.

Optionally, the method is such that the solution includes at least one of: water, water in a mixture with at least one of fructose, glucose and galactose, and a solution of at least one of fructose, glucose and galactose.

Optionally, the method additionally comprises, prior to contacting the first adsorbent with the beverage, separating the solid components from the beverage.

Optionally, the method is such that the separating of the solid components from the beverage includes at least one of: centrifugation or filtration.

Optionally, the method additionally comprises: contacting a second adsorbent with the beverage.

Optionally, the method is such that the second adsorbent includes a resin.

Optionally, the method additionally comprises: washing the second adsorbent with an aqueous solution to obtain a first eluent.

Optionally, the method additionally comprises: washing the first adsorbent with the first eluent to remove the hydrolyzed monosaccharides and obtain a second eluent.

Optionally, the method is such that the second eluent includes an aqueous solution mixed with monosaccharides.

Optionally, the method is such that the monosaccharides include one or more of fructose and glucose and galactose.

Optionally, the method is such that at least a portion of the treated beverage is mixed with an untreated portion of the beverage, resulting in an end product.

Optionally, the method is such that the at least a portion of the treated beverage is mixed with the untreated portion of the beverage, such that the end product includes at least 10% by volume of the untreated portion of the beverage.

Optionally, the method is such that the at least a portion of the treated beverage is mixed with the untreated portion of the beverage, such that the end product includes at least 25% by volume of the untreated portion of the beverage.

Optionally, the method additionally comprises: lowering the acidity of the treated beverage.

Optionally, the method additionally comprises: lowering the acidity of the mixture of the portion of the treated beverage with the respective portion of the untreated beverage.

Optionally, the method is such that the beverage includes at least one of juice or milk.

Optionally, the method is such that at least a portion of the treated beverage is mixed with a portion of a different beverage, resulting in an end product.

Optionally, the method is such that the portion of the different beverage includes the different beverage as an untreated beverage.

Optionally, the method is such that the treated beverage is a citrus juice.

Optionally, the method is such that the citrus juice includes at least one of orange juice and grapefruit juice.

Optionally, the method is such that the portion of the different beverage includes a non-citrus juice with a lower acidity than the treated citrus juice.

Optionally, the method is such that the non-citrus juice includes at least one of: mango juice, or carrot juice.

Optionally, the method is such that the at least a portion of the treated beverage is mixed with the untreated portion of the different beverage, such that the finished product includes at least 10% by volume of the untreated portion of the different beverage.

Optionally, the method additionally comprises: adding masking agents to the treated beverage.

Optionally, the method is such that the masking agents include one or more of: cinnamon, chocolate, vanilla, strawberry, coconut, ginger and licorice.

Optionally, the method additionally comprises: adding sweeteners to the treated beverage.

Optionally, the method is such that the sweeteners include one or more of: date, *Stevia*, agave fruit, honey, apple, Erythritol, Sweetango, and maple.

Optionally, the method is such that the beads change color indicative of the amount of sugar captured by the first adsorbent.

Embodiments of the invention are directed to a system for lowering the sugar content of a beverage. The system comprises: an adsorbent which is active so as to have selectivity for polysaccharides and their binding to the adsorbent; and, a hydrolysis unit in communication with the adsorbent for heating the adsorbent to a temperature where the bound polysaccharides are hydrolyzed to monosaccharides.

Optionally, the system is such that the adsorbent includes catalytic properties activated during the heating of the hydrolysis.

Optionally, the system is such that the hydrolysis unit comprises: a wash unit in communication with the adsorbent for washing the adsorbent with a solution to recover eluent from the adsorbent.

Optionally, the system additionally comprises: a solid separator in communication with the adsorbent.

Optionally, the system is such that the solid separator includes at least one of a centrifuge or a filter.

Optionally, the system is such that the selectivity of the adsorbent is based on a combination of non-covalent bonds and polysaccharide structure recognition.

Optionally, the system is such that the adsorbent is active so as to have selectivity for polysaccharides including disaccharides.

Optionally, the system is such that the disaccharides include at least one of sucrose or lactose.

Optionally, the system is such that the monosaccharides include one or more of fructose, glucose, and galactose.

Optionally, the system is such that the adsorbent includes zeolite.

Optionally, the system is such that the zeolite is in the form of at least one of: powder and granules.

Optionally, the system is such that the adsorbent includes the zeolite powder embedded in beads.

Optionally, the system is such that the beads include a food grade material.

Optionally, the system is such that the food grade material includes at least one of: hydrogel, organic resins glass, polymers, carbons, ceramics.

Optionally, the system is such that the hydrogel is a porous material.

Optionally, the system is such that the beads of the adsorbent or the granules of the adsorbent are arranged in at least one column.

Optionally, the system is such that the at least one column includes a plurality of columns.

Optionally, the system is such that the beads or the granules are approximately 1 mm to approximately 15 mm in diameter.

Optionally, the system is such that the beads or the granules include pores of approximately 0.1 micrometers (μm) to approximately 100 μm in diameter.

Optionally, the system is such that the zeolite is selected from zeolites including a Si/Al molar ratio of at least 5:1.

Optionally, the system is such that the zeolite is selected from zeolites including a Si/Al molar ratio of at least 10:1.

Optionally, the system is such that the zeolite includes at least one of: Y Zeolite, Y Zeolite H+, Y Zeolite Na, Y Zeolite K, or, Y Zeolite Ca.

Optionally, the system is such that the adsorbent includes an inorganic ion exchanger.

Optionally, the system is such that the adsorbent includes an organic Ion exchanger.

Optionally, the system is such that the inorganic ion exchanger includes zeolite powder.

Optionally, the system is such that the organic ion exchanger includes an organic resin.

Optionally, the system is such that the organic ion exchanger forms beads in which the inorganic ion exchanger is embedded therein.

Optionally, the system is such that the adsorbent includes a first adsorbent and additionally comprising: a second adsorbent with selectivity for at least one of polysaccharides, monosaccharides, and organic acids, in communication with the first adsorbent.

Optionally, the system is such that the second adsorbent includes a resin.

Optionally, the system additionally comprises a wash unit in communication with the second adsorbent, for washing the second adsorbent with a solution to recover an eluent from the second adsorbent.

Optionally, the system is such that the beads are configured to change color indicative of the amount of sugar removed from the beverage.

Optionally, the system is such that the adsorbent includes zeolite powder coated onto beads.

Optionally, the system is such that the beads include a ceramic or other inorganic material.

Optionally, the system is such that the adsorbent is arranged in a plurality of columns.

Optionally, the system is such that the plurality of columns are arranged as a simulated moving bed.

Embodiments of the invention are directed to a system for lowering the sugar content of a beverage. The system comprises: an adsorbent which is active so as to have selectivity for polysaccharides and their binding to the adsorbent, the adsorbent included in a plurality of columns configured for facilitating the flow of a beverage therethrough for sugar removal, and the plurality of columns arranged as a simulated moving bed.

Optionally, the system is such that the adsorbent includes zeolite powder associated with beads in each of the plurality of columns.

Optionally, the system is such that the adsorbent includes zeolite granules in each of the plurality of columns.

Embodiments of the invention are directed to a beverage which has been treated from an initially untreated form to a treated form is such that the treated form of the beverage includes: 1) at least 30% less sugar than the untreated form of the beverage, and, 2) a ratio of sucrose to total sugars below at least 30 percent.

Optionally, the beverage is such that the treated form of the beverage includes a ratio of sucrose to total sugars below at least 20 percent.

Optionally, the beverage is such that the treated form of the beverage includes a ratio of sucrose to total sugars below at least 10 percent.

Embodiments of the invention are directed to a beverage which has been treated from an initially untreated form to a treated form is such that the treated form of the beverage includes: 1) at least 30% less sugar than the untreated form of the beverage, and, 2) a brix/acidity ratio of less than +/−20 percent when compared to the untreated form of the beverage.

Optionally, the beverage is such that the treated form of the beverage includes a brix/acidity ratio of less than +/−10 percent when compared to the untreated form of the beverage.

Optionally, the beverage is such that the treated form of the beverage includes bitterness masking agents.

Optionally, the beverage is such that the bitterness masking agent includes a natural extract selected from the group consisting of: cinnamon, chocolate, vanilla, strawberry, coconut, ginger and licorice.

Optionally, the beverage is such that the treated form of the beverage includes sweeteners.

Optionally, the beverage is such that the sweeteners include one or more of: date, *Stevia*, agave fruit, honey, apple, Erythritol, Sweetango, and maple.

Embodiments of the invention are directed to a beverage comprising juice which has been treated from an initially untreated form to a treated form is such that the treated form of the beverage includes at least 30% less sugar than the untreated form of the beverage. The beverage is treated by a process comprising: contacting an adsorbent with a beverage, the adsorbent being active so as to have selectivity for polysaccharides, to treat the beverage and obtain the treated beverage;

Optionally, the beverage is such that the adsorbent includes zeolite.

Embodiments of the invention are directed to a beverage comprising milk which has been treated from an initially untreated form to a treated form is such that the treated form of the beverage includes at least 30% less sugar than the untreated form of the beverage.

Embodiments of the invention are directed to an apparatus for reducing sugar in a beverage. The apparatus comprises: a housing surrounding an inner chamber, the housing providing for the flow of the beverage through the inner chamber, and, an adsorbent in the inner chamber, the adsorbent being active so as to have selectivity for polysaccharides, to treat the beverage and obtain a treated beverage.

Optionally, the apparatus is such that the adsorbent includes zeolite.

Optionally, the apparatus is such that the zeolite includes at least one of: Y Zeolite, Y Zeolite H+, Y Zeolite Na, Y Zeolite K, or, Y Zeolite Ca.

Optionally, the apparatus is such that the zeolite is embedded in beads.

Optionally, the apparatus is such that the beads include a hydrogel with the zeolite embedded therein.

Optionally, the apparatus is such that the embedded zeolite includes zeolite powder.

Optionally, the apparatus is such that the hydrogel is a porous material.

Optionally, the apparatus is such that the beads include an organic resin.

Optionally, the apparatus is such that the embedded zeolite includes zeolite powder.

Optionally, the apparatus is such that the beads include pores of approximately 0.1 micrometers (µm) to approximately 100 µm in diameter.

Optionally, the apparatus is such that the zeolite is selected from zeolites including a Si/Al molar ratio of at least 5:1.

Optionally, the apparatus is such that the zeolite is selected from zeolites including a Si/Al molar ratio of at least 10:1.

Optionally, the apparatus is such that the adsorbent includes an inorganic ion exchanger.

Optionally, the apparatus is such that the housing includes a first membrane and a second membrane closed along their periphery to define the inner chamber, the first membrane and the second membrane of a material for facilitating the flow of liquid therethrough.

Optionally, the apparatus is such that the first membrane and the second membrane include porous materials.

Optionally, the apparatus is such that the porous materials include at least one of: paper, paper-like materials, polymeric materials, fabric, fabric-like materials, cloth, and cloth-like materials.

Optionally, the apparatus is such that the beads are configured to change color indicative of the amount of sugar captured by the adsorbent.

Embodiments of the invention are directed to an apparatus for reducing sugar in a beverage. The apparatus comprises: a housing surrounding an inner chamber, the housing providing for the flow of the beverage through the inner chamber, and, an adsorbent including Y zeolite, in the inner chamber, the adsorbent being active so as to have selectivity for polysaccharides, to treat the beverage and obtain a treated beverage.

Embodiments of the invention are directed to an apparatus for reducing sugar in a beverage. The apparatus comprises: a bead including an active adsorbent having selectivity for polysaccharides in the beverage, and the bead configured to change color indicative of the amount of sugar adsorbed from a beverage which is treated in the column.

Optionally, the apparatus is such that the bead is approximately 1 millimeter to approximately 15 millimeters in diameter.

Optionally, the apparatus is such that the bead includes ion exchange media embedded therein.

Optionally, the apparatus is such that the bead includes a hydrogel.

Optionally, the apparatus is such that the hydrogel is a porous material.

Optionally, the apparatus is such that the bead includes an ion exchange material.

Optionally, the apparatus is such that the ion exchange media includes at least one of: zeolite, resin and combinations of zeolite and resin.

Optionally, the apparatus is such that the zeolite is in the form of a powder.

Optionally, the apparatus is such that the ion exchange material includes at least one of: inorganic ion exchange material and organic ion exchange material.

Optionally, the apparatus is such that the active adsorbent includes zeolite powder.

Optionally, the apparatus is such that the bead includes pores of approximately 0.1 micrometers (μm) to approximately 100 μm in diameter.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to hose skilled in the art how embodiments of the invention may be practiced.

Attention is now directed to the drawings, where like reference numerals or characters indicate corresponding or like components. In the drawings:

FIG. 2 shows enlarged cross-sections of differently shaped beads and bead-like or granule-like structures in accordance with embodiments of the invention;

FIG. 3 is a table of exemplary resins for the system in accordance with embodiments of the invention;

FIG. 16 are photographs of Zeolite used in columns;

DETAILED DESCRIPTION OF THE DRAWINGS

Figure 1A:
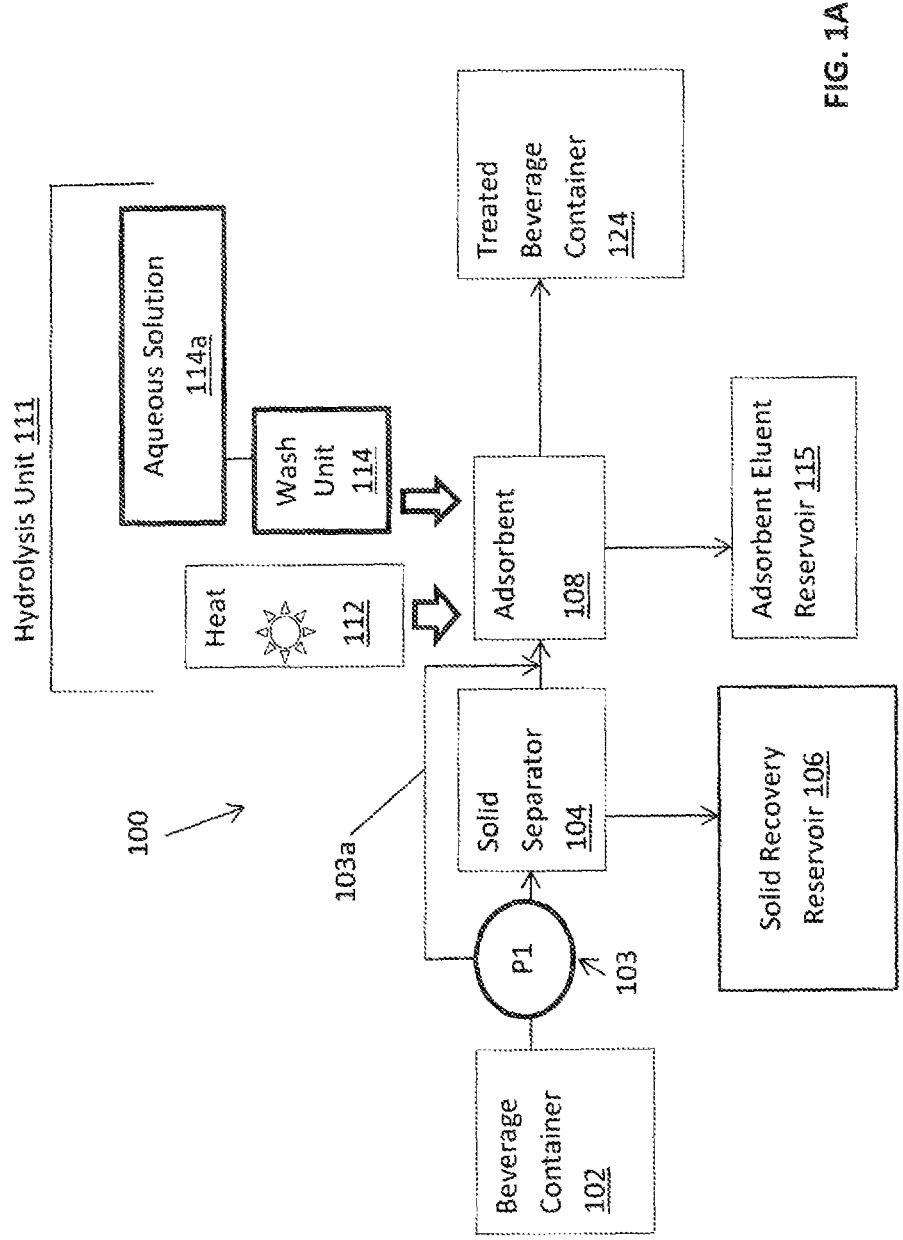
FIG. 1A is a diagram of an exemplary system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Throughout this document, directional references are made to directional terms such as "downstream" and "upstream". These directions are based on the flow of liquid, e.g., the beverage and/or filtrate thereof, such that a "downstream" is the leading direction of the fluid flow, and "upstream" is the opposite direction.

It is noted that in this document, references to orange juice are exemplary, as orange juice is representative of citrus juices, to which the descriptions for orange juice are also applicable.

FIG. 1A is a diagram of a system 100 in accordance with embodiments of the present invention. The system 100 is designed for treating high sugar content liquids, such as beverages which include sugar, such as fruit and vegetable juices (e.g., native fruit and vegetable juices), milk and other dairy and non-dairy liquids, to remove sugar therefrom, and create reduced sugar or sugar free beverages.

The system 100 includes a container or holding unit 102 ("container" and "holding unit" used interchangeably herein) for beverages. The beverages in the container 102 are beverages which have not been treated by the system 100 and for description purposes are known as "untreated beverages", or beverages which will be treated by the system 100. The beverages in the container 102, which are "untreated", as they have not yet been subject to treatment by the system 100, are also known as "beverage", "initial", "first", or "original" beverage. This container 102, for example, is in fluid communication with one or more pumps (P1) 103 or the like for creating flow paths (pathways) through the system 100, to treat the untreated beverage, from the container 102, downstream to the treated beverage container 124, for example, via the solid separator 104 (depending on the beverage being treated), and the adsorbent 108, as connected over fluid lines. The pump P1 103 is exemplary, for creating a flow path through 100, any number of pumps positioned anywhere along the system 100 is also permissible to create the flow path through the system for the beverage.

From the container 102, the pump (P1) 103 pushes (propels) the untreated beverage, if the beverage contains solids in suspension, for instance, if it is a juice, such that it passes through a solid separator 104. This solid separator 104 includes, for example, one or more centrifugation units or filters, to separate the solids, for example, pulp and other solid material, from the juice, with the pulp and other solid material recovered in the solid recovery container 106.

While the solid separator 104, is, for example, a centrifuge, other filters for various particulates in suspension in the beverage may be used with, or in place of, the centrifuge, depending on the beverage. Also, ultrafiltration and other separation technologies may be used in the place of the aforementioned centrifuges. The beverage which passes through the solid separator 104, and subject filtration, e.g., by centrifugation or filters, is now a filtrate.

The filtrate, which passed through the solid separator 104, then contacts the adsorbent 108. Should the beverage lack particulates, such as milk, the pump (P1) 103 would transport the beverage to the adsorbent 108, over the line 103a, bypassing the solid separator 104. The milk then contacts the adsorbent 108.

The adsorbent 108 selectively captures sugar molecules, for example, one or more of polysaccharides, including disaccharides, such as sucrose, and lactose, by a combination of 1) forming non-covalent bonds with the sugar molecules at the pH of the beverage, and, 2) structural matches between the sugar receptors or "holes" in the adsorbents microstructure, and the sugar molecule. The structural matching, for example, is such that the "holes" in the microstructure match the polysaccharide structure, which is known as (polysaccharide) "structure recognition". The adsorbent is, for example, zeolite (also referred to herein as a zeolite adsorbent), either in the form of a powder associated with a carrier, or in the form of granules.

Non-covalent bonds of the sugar molecules by the sugar receptors structurally matching the "holes: of the adsorbent may be partially based on one or more of: ionic interactions, hydrophobic interactions, hydrogen bonds, Van der Waals Interactions, electrostatic interactions, ion induced dipole, dipole induced dipole. Noncovalent bonds enable one large molecule to bind specifically but transiently to another. In some non-limiting embodiments, multiple noncovalent bonds may confer binding specificity.

For the structural matching, Zeolite has a microstructure that includes binding sites or "holes" which serve as receptors for sugar molecules, by providing a structural match for the sugar molecules. This structural match of the sugar molecules in the "holes", serving as sugar molecule receptors, allows for binding of the sugar molecules in the holes of the zeolite. Other examples of the adsorbent 108 include, for example, Calcium Manganese Oxide (CMO) and (CFO) materials.

In some embodiments, beads serve as a carrier for a zeolite powder. The beads are formed, for example, by a food-grade material into which the zeolite powder is integrated. The food-grade material is, for example, a hydrogel, and the zeolite powder is encased or otherwise embedded in, and retained within the hydrogel. The beads are preferably porous, such that it allows liquid flow into and through the beads, so as to contact the zeolite powder, while retaining the zeolite powder within the bead. The pores in the hydrogel are approximately 0.1 micrometers ($\mu m$) to approximately 100 $\mu m$ in diameter.

The hydrogel is, for example, an alginate. For example, the aforementioned beads are spherical, rounded, or otherwise substantially spherical, and of approximately 0.1 millimeter (mm) to approximately 15 millimeters in diameter, and for example, approximately 0.1 mm to approximately 5 mm, as a small bead (see EXAMPLES, below), and, approximately 5 mm to approximately 15 mm, as a large bead (see EXAMPLES, below).

While hydrogel is described as a material for beads, other food grade materials such as glass, polymers, carbons, ceramics, of suitable porosity, may also be used as the porous material for the beads. In some embodiments, the beads are coated on their surface with adsorbent, and accordingly, the beads may also be made from non-porous food-grade materials, such as glass, polymers, carbons, ceramics, and the like.

Other carriers include, for example, microfibers, microtubes, high-porosity scaffolds, metallic organic frameworks (MOH), covalent organic frameworks (COF), columns, conduits, or any other device presenting a large contact surface. These other carriers are such that the zeolite powder is coated or bound onto the surface of the carrier, with the coated or bound powder serving as receptors for sugar molecules. These other carriers, for example, are of food grade materials such as glass, polymers, carbons, ceramics, and the like. Additionally, for tubes, columns, conduits, and the like, the inner surfaces may be coated with adsorbent to bind sugar molecules passing through these for tubes, columns, conduits, and the like.

The shape of the carrier and its components, e.g., an embedded or other attached adsorbent material, is typically optimized in order to maximize the amount of the surface area which contacts the beverage or beverage filtrate being treated. FIG. 2 shows enlarged cross-sections of differently shaped beads and bead-like structures/devices, these bead shapes being carriers for the adsorbent material of the adsorbent 108.

The zeolite is also in the form of granules. These granules have an appearance similar to that of stones or rocks, and are, for example, tightly bound aggregates, which do not break away from the granule. For example, the zeolite granules have sizes of approximately 1 mm to approximately 15 mm in diameter.

The zeolite powder may also be embedded and encased within resin beads, which serve as the carrier. The resin of the beads is an organic ion exchanger, while the zeolite powder is an inorganic ion exchanger. These resin beads with the embedded zeolite powder are, for example, of a diameter of approximately 0.1 mm to approximately 15 mm. This combination of an organic ion exchanger with an inorganic ion exchanger is, for example, intended for: 1) different sugar separation, either continuously (mixed) or sequentially, and/or, 2) sugar and organic acid separation, either continuously (mixed) or sequentially. Some exemplary resins are listed in FIG. 6, and include, for example, Sodium ionic form resins. Examples of zeolites as the inorganic ion exchanger include strong dealuminated zeolites and NaX type zeolites.

Zeolites, in powder or granular form include, for example, strong dealuminated zeolites and NaX type zeolites. Other Zeolites include, for example, Zeolite Y (Type Y Zeolites) compositions, for example, including: Z-5: zeolite Y hydrogen powder with surface area of 730 m2/g and at SiO2:Al2O3 molar ratio of 5:1, commercially available as Alfa Aesar 45866; Z-30: zeolite Y hydrogen powder and with surface area of 780 m2/g and SiO2:Al2O3 molar ratio of 30:1, commercially available as Alfa Aesar 45870; and, Z-80: zeolite Y hydrogen powder and with surface area of 780 m2/g and SiO2:Al2O3 molar ratio of 80:1, commercially available as Alfa Aesar 45866.

Other Y Zeolites (Type Y Zeolites), for example include, Y Zeolite $H^+$ (Hydrogenated), Y Zeolite Na (Sodium), Y Zeolite K (Potassium), Y Zeolite Ca (Calcium), all in cationic form.

The zeolite, for example, may be of two, or more, different zeolite types, which are primarily intended for: 1) different sugar separation, either continuously (mixed) or sequentially (system 100' of FIG. 1B), and/or, 2) sugar and organic acid separation, either continuously (mixed) or sequentially.

In some embodiments of the invention, the binding of the sugar molecules relies on adsorption by at least one form of natural or synthetic zeolite.

The non-covalent bonds, of the zeolite to the sugar molecules, optionally involve energy on the order of 1-5 kcal/mol and allow for releasing the sugar molecules from the receptors and carrier at the end of the process for regeneration (after sugar has been removed from the beverage being treated) so to optionally produce a sugar, e.g., sucrose syrup eluent (or other liquid presenting a high concentration in sugars), which may then be purified and sold as a by-product. The release of the sugar molecules from the receptors (i.e., holes) may be performed by at least one of: hydrolysis, a change of pH, the flow of high-pressure or low-pressure gas or liquid through or around the carrier, hot or cold gas or liquid flow through or around the carrier, or any other suitable chemical or physical means, including shaking. In some embodiments, the carrier may be washed (regenerated) and re-used a number of times following the release of the sugar molecules, typically 10-100 times, and optionally up to 1000 times or more.

The adsorbent 108 is associated with a first hydrolysis unit 111, for example, heater 112 and a wash unit 114 (the wash unit 114 in fluid communication with a source of washing solution 114a, such as an aqueous solution). The heater 112 is used in hydrolysis of the sugars bound to the adsorbent 108 The heater 112 heats the adsorbent 108, for example, to at least approximately 40 degrees Celsius, The heating promotes hydrolysis of the bound (adsorbed) polysaccharides, captured by the adsorbent by catalyzing the bound polysaccharides into, for example, monosaccharides. Enzymes, such as Invertase, may also be used to enhance the hydrolysis of the adsorbed polysaccharides.

The wash station 114 emits solution (from reservoir 114a) for washing the adsorbent 108. The wash station 114, for example, includes a pump (not shown), for drawing the solution from the reservoir 114a, and washing the adsorbent 108. The resultant eluent flows into a container 115 for recovery and collection. This eluent includes, for example, solutions of monosaccharides, such as fructose and glucose, for juices, and glucose and galactose, in the case of milk.

In some embodiments the heater 112 is heating the washing solution. The hot washing solution flows through the adsorbent 108, causing hydrolysis of the polysaccharides or disaccharides bound to the adsorbent 108, and washes the adsorbent 108, at the same time to form an eluent.

A treated beverage container 124 receives the treated beverage, from the adsorbent 108. The treated beverage, i.e., treated juice, milk, or the like, is stored in the container 124. This treated beverage may be subjected to additional processing, as detailed below, such that the resultant further processed beverage is considered to be the end or finished product (the terms "end product" and "finished product" are used interchangeably herein). For instance, the solids removed by solid separator 104 might be reintroduced into the treated beverage in whole or in part. Alternately, should the treated beverage not be subject to any further processing, the treated beverage itself is considered as the end or finished product.

Figure 1B:
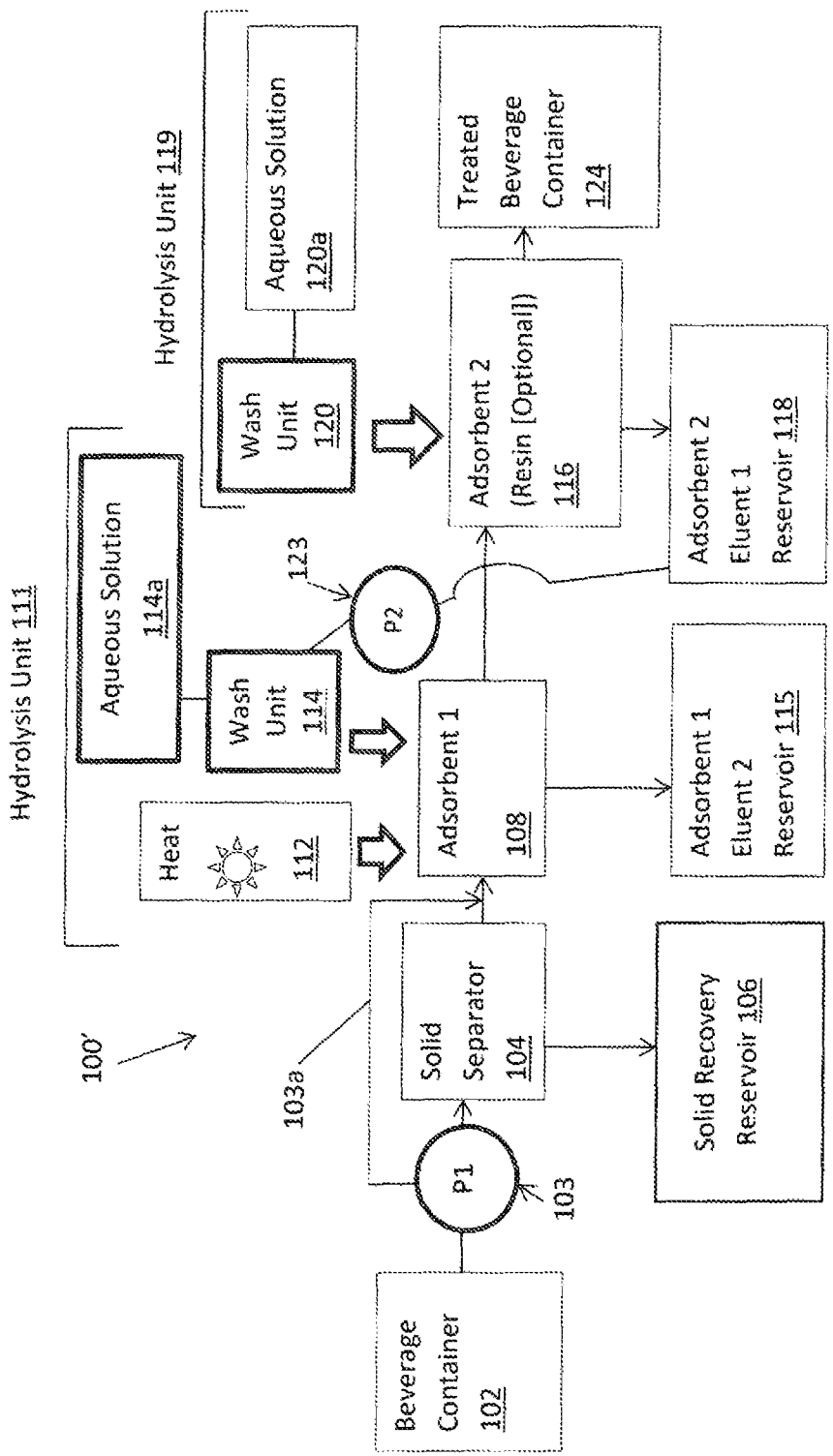
FIG. 1B is a diagram of another exemplary system in which embodiments of the disclosed subject matter are performed.

FIG. 1B is a diagram of a system 100' in accordance with embodiments of the present invention. The system 100' is similar to the system 100 of FIG. 1A, with identical and/or similar components of the system 100' having the same element numbers as those corresponding elements in the system 100, and are in accordance with the descriptions for the elements of the system 100. Differences between the systems 100, 100' are indicated in the description of the system 100' below.

The system 100' includes a second adsorbent 116, for example, downstream from the first adsorbent 108. The second adsorbent 116 is, for example, an organic ion exchange media, such as a resin. The second adsorbent 116 is in communication with a second hydrolysis unit 119, which includes a wash unit 120 (also with a pump, which is not shown), which is supplied with an aqueous solution (from a reservoir 122) for washing the resin 116. Washing the resin 116 results in an eluent, which is recovered in a container 118. This eluent is, for example, used either with or instead of the aqueous solution from the reservoir 114a, for washing the adsorbent 108 (also known here as the "first adsorbent"). The washing solution used in washing the first adsorbent 108 is, for example, the resin eluent of at least one of fructose or glucose, from the container 118.

A pump (P2) 123 delivers the eluent from the container 118 to the wash unit 114. The eluent may also be mixed with water or other aqueous solution from the aqueous solution source 114a.

From the second adsorbent 116, the treated beverage is moved to the treated beverage container 124, where it is stored until further processing is performed, resulting in an end product, or the treated juice is considered to be the end product.

The resin of the second adsorbent 116 is an organic ion exchanger, for use as sugar receptors and/or carriers. The resin is used in sugar-related applications, for example, where the end-product is the sugar, i.e., high-fructose syrup.

The organic ion exchanger (resin) includes receptors, which are selective for sugar. Example resins include, for example Sodium ionic form resins, and resins developed by Dow DuPont Chemical Company of Midland, Michigan USA as the DOWEX™ resins for the selective separation of carbohydrates, including sugars and sugar molecules, from solution, including, for example, DOWEX 99 Ca resins with uniform 220, 280, 310 and 350 μm particle size beads, and loaded with 4 ions, Ca, Na, K or H+. DOWEX MONOSPHERE™ 99 Ca Chromatography Resin is a uniform particle size, gel, strong acid cation resin, supplied in the Ca-form, with approximately 220 μm particle size beads. DOWEX MONOSPHERE™ 99 K/280 is a resin with approximately 280 μm particle size beads. DOWEX MONOSPHERE™ 99 K/310 is a resin with approximately 310 μm particle size beads. DOWEX MONOSPHERE™ 99 K/350 chromatography resin is a uniform particle size gel, and a strong acid cation resin, supplied in the K-form, a resin with approximately 350 μm particle size. The aforementioned resins for the second adsorbent 116, as well as additional resins suitable as the second adsorbent 116 are provided in the table of FIG. 3.

Alternately, the resin of the second adsorbent 116 includes two different resin types or organic ion-exchange technologies or media for sugar separation, either continuously (mixed) or sequentially. In other alternates, the resin of the second adsorbent 116 may be two different resin types or organic ion-exchange technologies for sugar and organic acid separation, either continuously (mixed) or sequentially.

Alternately, the system 100' may be such that inorganic (first adsorbent 108) and organic (second adsorbent 116) ion-exchangers are both used as part of the sugar extraction process, either sequentially, or mixed into the same device or carrier, and used simultaneously. The combination of both organic and inorganic ion exchange technologies is intended to selectively remove different sugar molecules, or sugar molecules and organic acids, from the beverage, such as juice. Alternately, the second adsorbent 116 is specifically binding organic acids.

For example, the treated beverage, such as juice (e.g., fruit and vegetable), milk (e.g., and other dairy beverages), and the like, is about 15 to about 75 percent less sugar than the beverage prior to its treatment by either of the systems 100, 100', and typically the sugar reduction is about 30 percent to about 50 percent.

Alternately, the positions of the first adsorbent 108 and the second adsorbent 116 in the system 100' may be exchanged, such that the second adsorbent 116 is upstream of the first adsorbent 108. In this case, the second hydrolysis unit 119, i.e., wash unit 120 and its aqueous solution source 122 would be positioned proximate to the second adsorbent 116, while the first hydrolysis unit 111, i.e., heater 112, wash unit 114 and aqueous solution source 114a, would be positioned proximate to the first adsorbent 108, the first adsorbent 108 now downstream of the second adsorbent 116. Pump (P2) 123 would transport eluent recovered from the now upstream second adsorbent 116, to the now downstream first adsorbent 108, for the hydrolysis process of the first adsorbent 108.

Figure 4A:
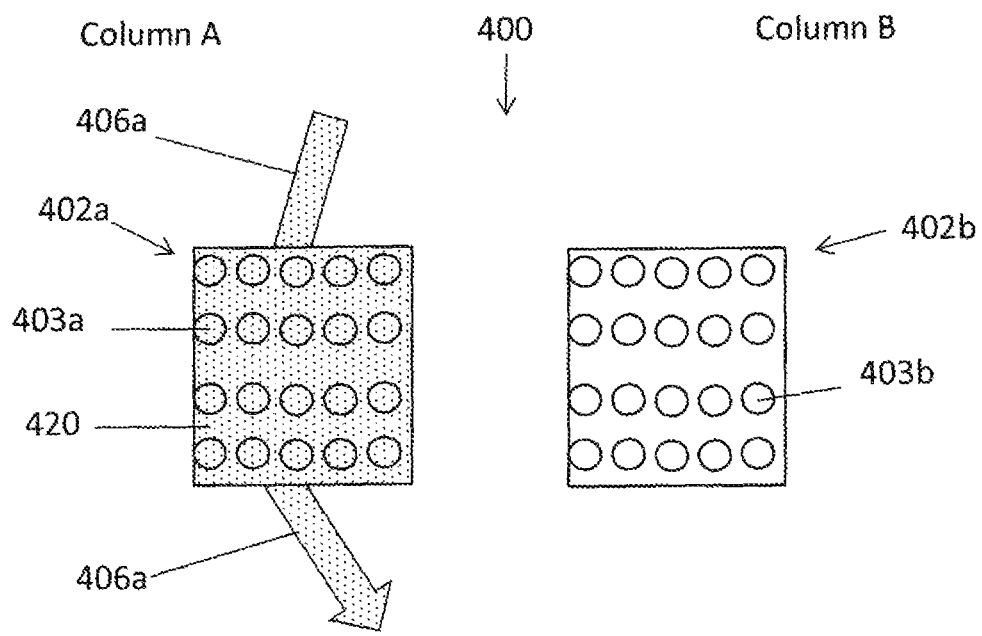
FIGS. 4A and 4B are diagrams of a column used as the adsorbent in continuous operation in accordance with embodiments of the invention.
Figure 4B:
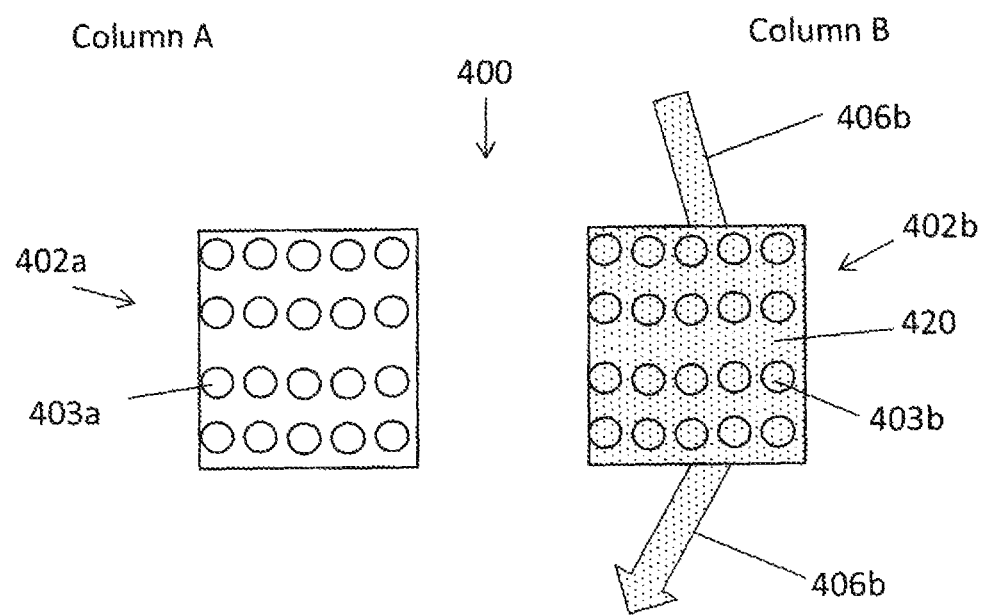

Attention is now directed to FIGS. 4A and 4B which show a continuous flow sugar removal process from a beverage. The system 400 serves, for example, as the first adsorbent 108 (detailed above and shown in FIGS. 1A and 1B), and includes, for example, at least two columns Column A 402a, and Column B 402b, each column 402a, 402b filled with adsorbent associated with a carrier 403a, 403b. The adsorbent is, for example, zeolite, as detailed above for the adsorbent 108 above, in a carrier, such as beads, microfibers, microtubes, as detailed above, or the adsorbent is in the form of granules, as detailed above. The carriers and the granules are held in the columns 402a, 402b, which are, for example, tubes, cylinders, containers, conduits, or the like, constructed and arranged to allow the untreated filtrate or untreated beverage (if not subjected to solid separation) to flow therethrough continuously. The tubes, cylinders, containers, conduits, or the like, are for example, of inert materials, such as glass. The ingress/egress of the beverage into and through the respective column is represented by the arrow 406a for Column A 402a, and the arrow 406b for Column B 402b.

The process of sugar removal from a beverage is illustrated in FIGS. 4A and 4B taken together. This process is a sequential process, as the beverage 420 flows continuously, alternating through column A 402a and Column B 402b.

In FIG. 4A, the beverage continuously flows through column A 402a as part of its processing, as shown by the arrow 406a. After it is estimated or measured that the sugars from the beverage 420 are large part bound to the adsorbent of the carriers of Column A 402a, such that Column A 402a is of reduced or minimal efficacy in removing additional sugar molecules from the beverage, the beverage is then redirected to column B 402b, as shown by the arrow 406b. Column B 402b includes a ready-to-use carrier 403b.

While beverage 420 flows through column B, either: 1) the sugar molecules are removed from the carrier 403a of Column A 402a, as Column A 402a is regenerated for further use, or, 2) the carrier 403a of column A 402a is removed and replaced with a new carrier or column. Similarly, when the carrier of Column B 402b becomes partially or completely saturated and sugar removal from the beverage becomes inefficient or minimized, one cycle (e.g., sugar removal cycle) of the process is complete, as the beverage 420 is then redirected to a now regenerated column A 402a, as shown by the arrow 406a, starting a subsequent cycle. Regenerated Column A 402b includes a regenerated or new ready-to-use carrier 402a. The aforementioned process continues for one or more cycles, as is necessary to remove the desired amount of sugar from the beverage 420. The now treated beverage flows to the holder 124 (FIG. 1A) or to the second adsorbent 116 (FIG. 1B).

While two columns 402a, 402b are shown for the sugar removal process, this is exemplary only, as the sugar removal process of FIGS. 4A and 4B may be implemented with more than two columns. The column system may also be arranged as a Simulated Moving Bed system (SMB).

The carrier 403b is included in two columns Column A 402a, and Column B 402b. In both columns Column A 402a, and Column B 402b, the carrier 403a, 403b, for example, microtubes, microfibers, beads, granules or porous material, is included in or attached to the inner lumen 404a, 404b of the respective column 402a, 402b. Each column 402a, 402b might also be a pipe, container, conduit, tube or the like, constructed and arranged to allow the untreated filtrate or untreated beverage (if not subjected to solid separation) to flow therethrough continuously. The flow pathway in the carriers 403a, 403b is from an ingress port 406a, 406b to an egress port 408a, 408b, and alternately, through the first column (Column A) 402a and then through the second column (Column B) 402b, or vice versa. Within each of the columns 402a, 402b, the receptors on the carrier bind to the sugar molecules as the untreated filtrate or untreated beverage flows through the respective carrier 403a, 403b. The process of the untreated filtrate or untreated beverage flowing through the columns 402a, 402b is in one or more cycles (e.g., sugar removal cycles), such that a cycle includes a continuous liquid flow through Column A 402a and Column B 402b, or vice versa. While FIGS. 4A and 4B include only two columns, systems of more than two columns may also be employed. The column system might be arranged as a Simulated Moving Bed system (SMB)

FIGS. 5A-5D show the adsorbent 108, for example, associated with a carrier, such as beads 520, bead-like structures, or as granules, all as detailed above. The adsorbent 108, is shown, for example as beads 520, in a container 522 or column. The beads 520 are used as part of a "batch" process, for the discontinuous removal of sugar from a beverage.

Figure 5A:
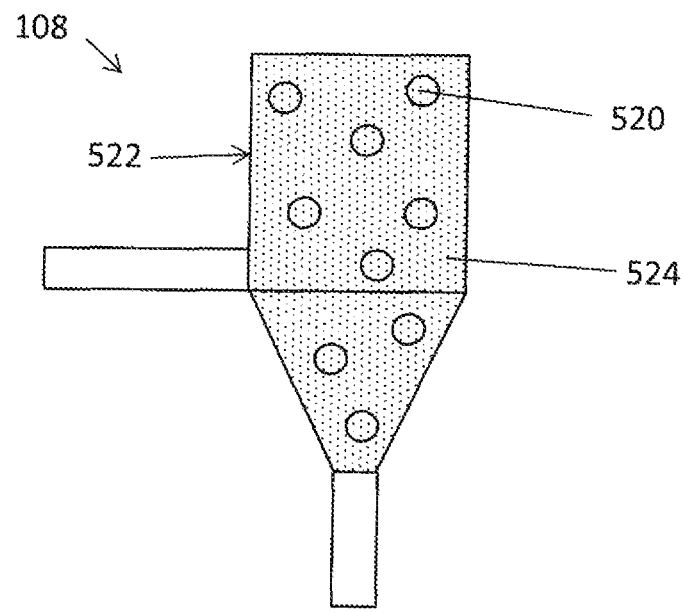
FIGS. 5A-5D illustrate a schematic cross-section of a device in an example process for the discontinuous removal of sugar from a beverage in a "batch" process, in accordance with embodiments of the invention.

In FIG. 5A, the beads 520 are mixed with the beverage (e.g., untreated filtrate or untreated beverage) 524 in the container 522. Optionally, the beverage 522 and beads 520 are stirred to increase the efficacy of the sugar binding (sugar removal) process.

Figure 5B:
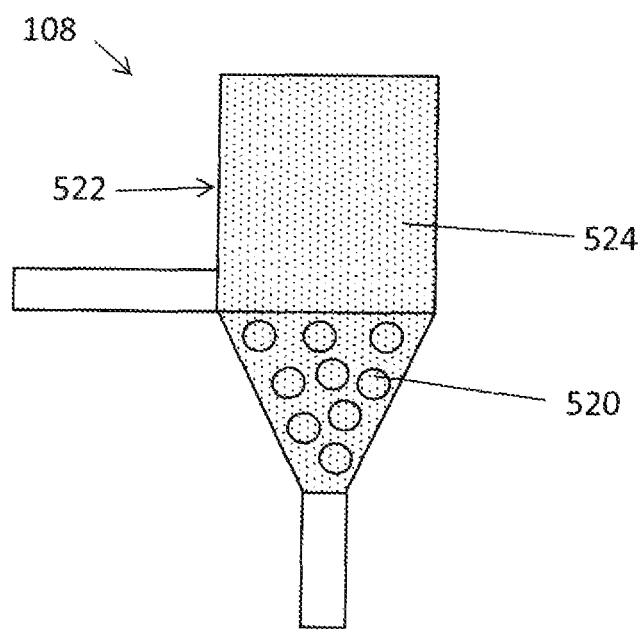
Figure 5C:
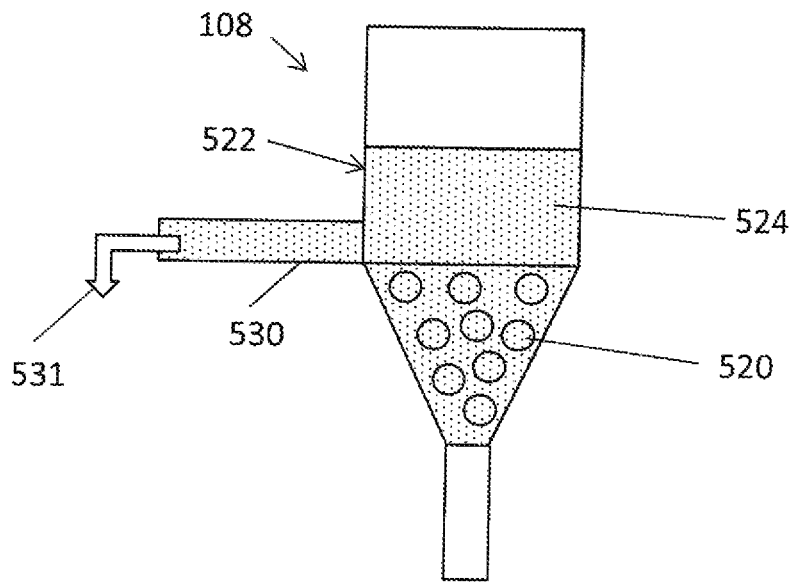
Figure 5D:
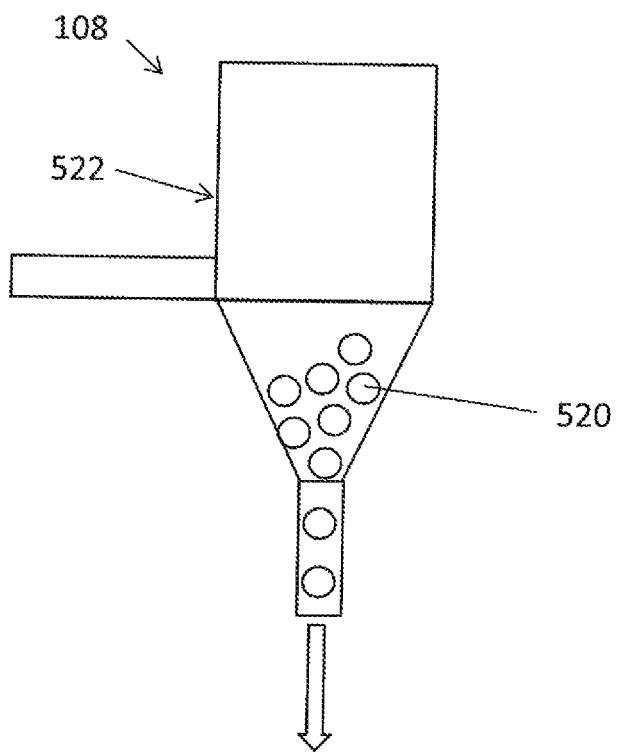

In FIG. 5B, the beads 520 have sunk in the container 522, due to gravity. Here, the beads 520 present a higher density than the beverage 524. The beads 520 are received at the bottom of the container 522, and then the beverage 524 is removed from the container 522, as shown in FIG. 5C, leaving the beads 520 at the bottom of the container 522. The now treated beverage moves through a port 530, in the direction of the arrow 531, so as to flow to the holder 124 (FIG. 1A) or to the second adsorbent 116 (FIG. 1B). A further step includes removing the beads 520 from the container 522, as shown in FIG. 5D. The beads 520 are then either regenerated (sugar is removed from the receptors on each of the beads to make the beads ready for another use as a carrier), or new beads are used, replacing the previous beads, for a new batch. The process shown in FIGS. 5A-5D may be repeated for as long as desired, depending on the amount of sugar removal desired from the beverage.

Alternately, the beads 520 may be removed from the container 522 by harvesting (including manually), centrifuging, and other removal techniques.

Alternately, the beverage may present a higher density than the beads 520 or granules, whereby the beads 520 or granules float (and do not sink). As a result, the beads 520 or granules may need to be removed from the container 522 manually.

In other embodiments, the container 522, for example, includes at its bottom a net (e.g., of a porous fabric, cloth, polymeric material, and the like) or filter intended to stop the beads/carrier so that the treated beverage can flow through the net or filter out of container 522 and the beads can be harvested after the treated beverage has been removed from container 522.

The remainder of the process of sugar removal from the beverage would be in accordance with that described above for FIGS. 5A-5D.

Another suitable adsorbent 108 includes a porous carrier presenting a large contact surface, with connected pores, such that the beverage or beverage filtrate can flow through it. The porous carrier is, for example, a porous zeolite, as per the zeolites detailed above. The pores are, for example, of sizes in the range of approximately 0.1 micrometers to approximately 100 micrometers. This adsorbent is typically used to process clear beverages without suspensions, such as apple juice, or other beverage form which the solid materials have been removed.

It is noted that in some embodiments of the invention, a carrier composed of one or more beads, either independent of each other or in a column or other bead consolidated structure, may also be used in stand-alone devices by the end consumer, for removal of sugar in a beverage in a home or office setting. The user mixes the beads with the beverage and waits for a predetermined time for the receptors to bind the sugar, before consuming the beverage. For such domestic use, the carrier may include a color-changing feature indicating certain sugar saturation levels, so as to be indicative of the sugar amounts removed from the juice and/or sugar content of the now-treated juice. For home use, the adsorbent, is, for example, in the form of a powder included inside a porous bag to be used inside a beverage container, for example a can or a glass.

Additionally, the beads described above for the columns 402a, 402b and the container 522 may also be beads which change color to indicate certain sugar saturation levels, so as to be indicative of the sugar amounts captured by the adsorbent(s), from juice or other beverage, e.g., milk, or other dairy product liquid. Also, the beads of FIGS. 4A and 4B, as well as beads used as the adsorbents in the systems 100, 100' may also be of compositions suitable for changing color to indicate amounts of adsorbed, or otherwise removed, sugar.

Other embodiments of the invention include an apparatus reducing sugar in a beverage, formed by a housing surrounding an inner chamber including an adsorbent. This housing is, for example, a pouch, sealed along its periphery, at or proximate to the edges. The adsorbent is active (an active adsorbent) so as to have selectivity for polysaccharides, to treat the beverage, which passes into and out of the housing so as passes through the housing, resulting in a beverage treated such that its sugar content is reduced, when compared to the beverage in an untreated state. The adsorbent is, for example, zeolite, in beads, of both zeolite powder embedded in a porous material, such as a hydrogel, or coated on top the surface of a non-porous material, and zeolite granules, as detailed above. The beads may include multiple beads in the housing or a single large bead in the housing, which are sealed in the housing, or disposable, so as to be removed and replaced when the adsorbent is exhausted. When the bead is a single large bead, it typically lacks the housing, and is, for example, disposable.

Figure 6:
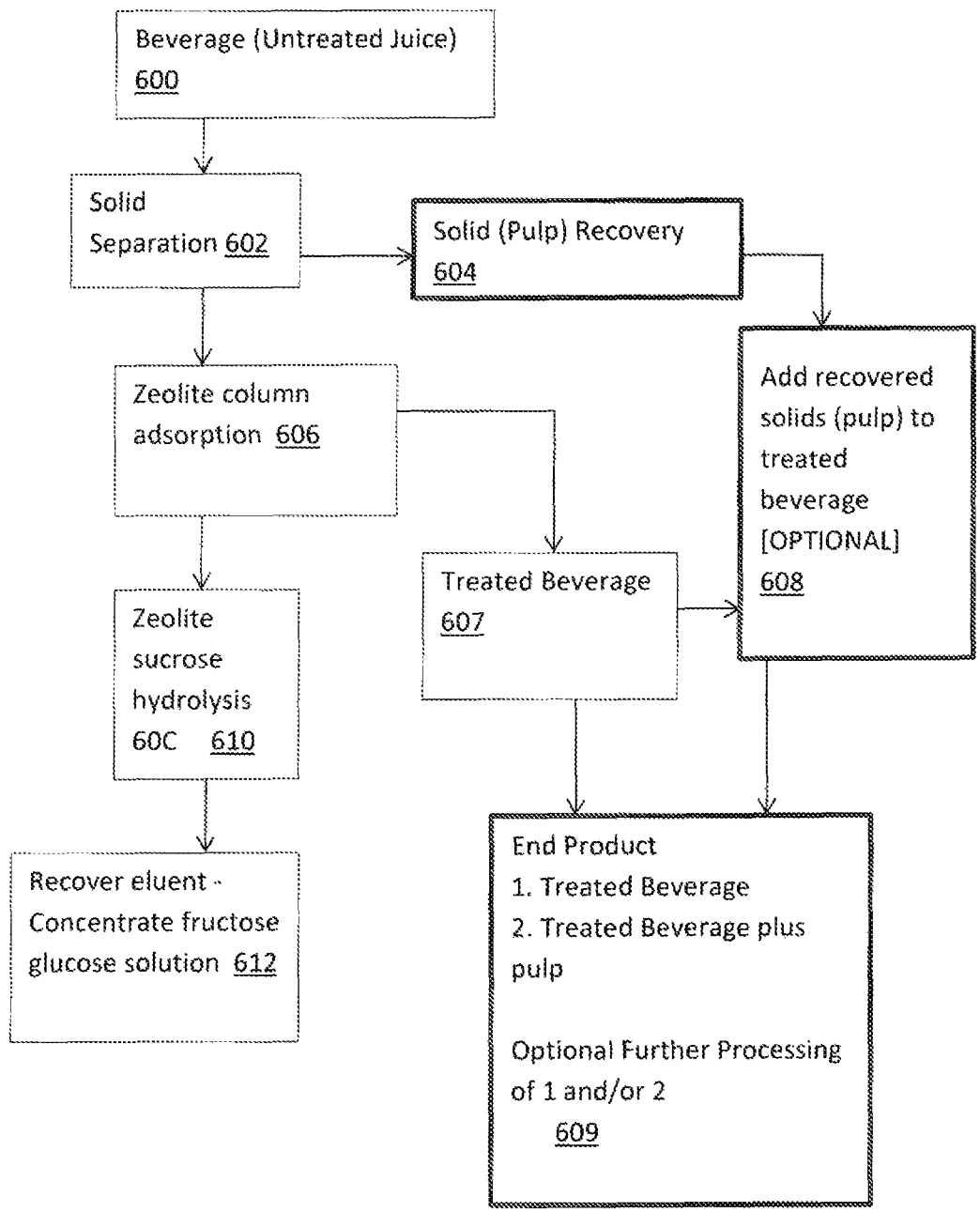
FIG. 6 is a process for sugar reduction in in beverages, in accordance the system of FIG. 1A.

The housing is formed, for example, of a liquid permeable material, in the form of two sheets, joined at the periphery, or a single sheet folded over and joined along its periphery. Within the closed periphery is the inner or interior chamber, which houses the adsorbent. The liquid permeable materials are, for example, in the form of membranes, and include papers, paper-like materials, polymeric materials, fabric, fabric-like materials, cloth and cloth-like materials, and the like. Attention is now directed to FIG. 6, which shows an example process of removal of sugar from untreated juice, by using an adsorbent, for example, zeolite in the system 100 of FIG. 1A, detailed above.

Initially, at block 600, a supply of untreated juice, orange or other is provided. The juice, from the holding container 102, is pumped to a solid separator 104, for example, a centrifuge or pulp filter, at block 602, resulting in solid (pulp) recovery, at block 604. The pulp is captured in a solid recovery container 106, and now separated from a filtrate. The filtrate is passed through the adsorbent 108, for example, a zeolite column, at block 606, yielding a treated beverage, e.g., juice, now reduced in sugar, at block 607. The now-treated beverage, e.g., juice is stored in the container 124. At this time, the treated juice may be considered to be the end product, at block 609.

In an optional process, the pulp, previously removed, and stored in the solid recovery container 106, at block 604, is recombined with the treated juice, at block 608, resulting in an end product beverage, at block 609, which remains in the container 124. At block 609, the existing end product juice may be subject to additional processes, which are optional, such as acid separation, pH adjustment, coloring, flavoring, mineralizing, adding vitamins and other nutrients, and the like.

Returning to block 606, the zeolite column, with the adsorbed sugar molecules bound thereto, is subjected to hydrolysis, at block 610, by the hydrolysis unit 111. The hydrolysis includes, for example, use of a catalyst, use of an enzyme, and/or heating the adsorbent to use its catalytic properties. The heating is from approximately 40 degrees C. to approximately 110 degrees C. (by the heating unit 112), with a typical heating being to approximately 60 degrees C. The catalyst is, for example, an enzyme, such as Invertase. The hydrolysis is followed by washing (by the wash unit 114) the zeolite column with an aqueous solution, at block 612. The washing is performed, for example, with water. Washing the catalyzed adsorbent yields an effluent of at least one of fructose and glucose, which is recovered and stored in an effluent reservoir 115.

Returning to block 609, the end product beverage is either the treated beverage, or the treated beverage plus the removed solids, e.g., pulp, which was previously separated from the beverage, but has now been returned thereto. The end product beverage may be subject to one or more optional additional processes, as detailed below.

Figure 7:
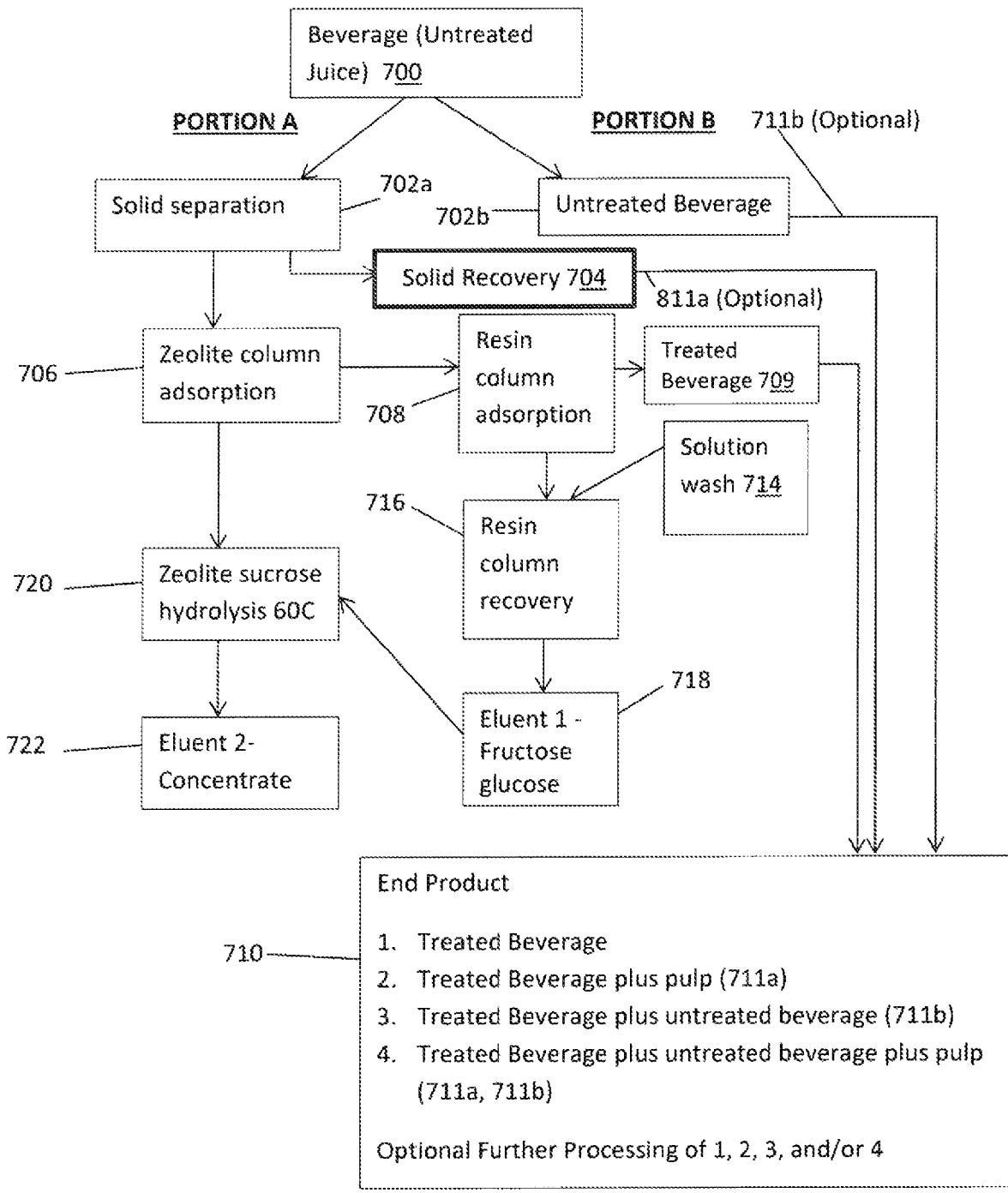
FIG. 7 is a another process for sugar reduction in beverages, in accordance with the system of FIG. 1B.

Attention is now directed to FIG. 7, which shows an example process of removal of sugar from a beverage, such as a native juice, by the system 100' of FIG. 1B.

Initially, at block 700, a supply of untreated juice, orange or other is provided, for example in the container 102. Also at block 700, the untreated juice is divided into two portions, one portion (Portion A) which remains in the container 102, and a second portion (Portion B), which is removed and placed in a separate container, at block 701. While equal portions of juice to be treated, and to remain untreated are shown, as Portion A and Portion B, respectively, Portion A, which is to be treated, may, for example, be up to about 90 percent of the total juice volume, leaving Portion B to remain untreated, and for example, as little as at least about 10 percent of the total native juice volume.

Portion A of the untreated juice, in the container 102, is subjected to solid separation, at block 702a. The solid separation includes for instance pulp centrifugation or filtration, as the untreated juice in the container 102 is pumped, by the pump (P1) 103 into the solid separator 104. Solids, which have been captured and recovered, i.e., the removed pulp, are stored in the solid recovery container 106, at block 704.

The filtrate (beverage), which has passed through the solid separator 104, is passed through a first adsorbent 108, for example, a zeolite column, at block 706. This passage through the first adsorbent 108 is, for example, to adsorb disaccharides, such as sucrose. The adsorbent column treated filtrate, at block 706, is now passed through a second adsorbent 116, for example, a resin column of DOWEX™ resin, at block 708, to cause the adsorption of sugars and/or acids to remove these additional molecules. These sugar reduction steps of blocks 706 and 708 yield a treated beverage (e.g., juice), now reduced in sugar, at block 709. The now-treated beverage is stored in the container 124.

The treated beverage of Portion A may itself be the end product at block 710. Alternately, the treated beverage of block 709 may be subject to two optional additions, represented by arrows 711a and 711b, resulting in an end product juice at block 710. Zero, one or both of the aforementioned optional processes may be performed on the treated juice of block 709. These optional processes may be performed on the treated juice of Portion A while it is in the container, or moved to another container (not shown with the system 100').

Arrow 711a represents adding the recovered solids, e.g., pulp, back into the treated juice of Portion A, which is one end product at block 710. Arrow 711b represents adding the untreated juice of Portion B to Portion A, which is another end product at block 710. Adding both the recovered solids, e.g., pulp, and the Portion B, to Portion A is yet another end product at block 710. The end products at block 710 include: 1. treated beverage of Portion A (block 709), 2. Treated beverage of Portion A plus recovered solids, e.g., pulp (block 709 and arrow 711a), 3. Treated beverage of Portion A plus untreated beverage of Portion B (block 709 and arrow 711a), and 4. treated beverage of Portion A plus recovered solids, e.g., pulp, plus untreated beverage of Portion B (block 709 and arrows 711a, 711b), Alternately, prior to adding the recovered slides and/or the Portion B may be have been processed by other process, treatments, and the like, but were not subjected to the adsorption by one or more adsorbents. The treated juice of Portion A, either alone or with the recovered solids and/or juice Portion B, added thereto, may be subjected to additional optional processes, such as acid separation, pH adjustment, coloring, flavoring, mineralizing, adding vitamins and other nutrients, and the like, which are detailed below.

Returning to block 708, the sugars adsorbed by the second adsorbent 116, e.g., the resin, are hydrolyzed by the second hydrolysis unit 119, and are recovered, at block 716, by washing the resin column with water, or other aqueous solution, for example, by the wash unit 120 (with the aqueous solution from a source 122). Resin eluent (Eluent 1) is recovered, at block 718. The resin eluent (Eluent 1) is, for example, an aqueous solution, of water in a mixture with at least one of fructose and/or glucose.

From block 706, the zeolite column, with the adsorbed sugar molecules bound thereto, is subject to hydrolysis, by the first hydrolysis unit 111, at block 720. The hydrolysis includes, for example, use of a catalyst, use of an enzyme, and/or heating the adsorbent to use its catalytic properties. The heating is from approximately 40 degrees C. to approximately 110 degrees C. (by the heating unit 112), with a typical heating being to approximately 60 degrees C. The catalyst is, for example, an enzyme, such as Invertase. The hydrolysis is followed by washing (by the wash unit 114) the zeolite column, optionally with the eluent (Eluent 1) from block 718, recovered from the resin column 116, and pumped via a pump (P2) 123, to the wash unit 114, at block 720. The washing elutes (yields) a concentrate solution or eluent (Eluent 2) (adsorbent byproduct 110) of the monosaccharides, fructose and glucose, as per block 722.

As a result of the process, the sugar content in the treated juice portion (block 709) is typically reduced by at least 40%, and may be reduced by approximately 70-90%. At the end of the process, both the treated and untreated portions are mixed together to obtain an end product at block 710, which is, for example, reduced-sugar juice mix, such as that with a 30-50% reduced sugar content (when compared to the sugar content of the untreated juice or untreated juice portion, e.g., Portion B).

The finished juice of block 609 and block 710 may be optionally subjected to additional processes. Some optional processes include, for example, acid separation, pH adjustment, coloring, flavoring, mineralizing, adding vitamins and other nutrients, and other processes.

Other optional processes include preserving and/or sterilizing the end product or finished juice by applying High-Hydrostatic Pressure (HPP) or pasteurizing the finished juice. The finished juice may also be cooled, or frozen. The finished juice may also be concentrated, with the lower sugar content of the finished juice allowing for a more efficient concentration step.

Optionally, before or during the sugar separation process of blocks 606 and 706 and 708 of FIGS. 6 and 7, where the beverage is cooled, to avoid oxidation or microorganism growth. Alternately, the beverage may be pasteurized or treated with HPP before the sugar separation process of blocks 606, and 706 (and 708), and then cooled following the sugar separation process of blocks 606, and 706 and 708.

Alternately, the end product beverages of blocks 609 and 710 may be subjected to additives, such as low-calorie sweeteners, low calorie or other sweetening sugars, collectively "sweeteners", such as sugar alcohols (polyols), date, Stevia, agave fruit, honey, apple, Erythritol, Sweetango, or natural additives. In some cases, additional ingredients may be added, such as acidity or bitterness masking agents (masking agents, bitterness regulators, or regulators), which are, for example, natural ingredients, to correct the taste and make it more appealing to customers once sugar is partially removed. Acidity regulators include, for example, sodium citrate.

The sweeteners compensate for the lower sweetness of the end-product, e.g., the treated beverage or finished beverage (treated beverage plus recovered solids) of blocks 607 and 609, and/or an added untreated beverage portion, of blocks 709 and 710. Similarly, various flavorings may be added to convey desired tastes to the end product and/or finished juice. Some flavorings may be such that they provide the end product and/or finished juice (blocks 607 and 609, and, 709 and 710) with known flavors. Example flavorings include, vanilla, cinnamon, chocolate, strawberry, coconut, honey, apple, and the like. These flavorings also serve as bitterness masking agents. Such additives are preferably of natural origins. Optionally, flavors such as ginger, licorice or others may be added. These flavors, for example, vanilla, cinnamon, chocolate, strawberry, coconut, ginger and licorice, also serve as bitterness masking agents.

Also before or following the sugar removal steps of blocks 606, or 706 or 708, other ingredients, such as acidity regulators (detailed above) or bitterness regulators or masking agents (detailed above), bulking agents etc., such as in the form of natural ingredients, may be optionally added, to correct the flavor and make the treated juice more appealing to customers, as the sugar has been at least partially removed. An acidity regulator may be used to keep the Brix/acidity ratio with a predefined range in order to preserve a taste acceptable to end consumers. For example, the treated form of the beverage, i.e., treated juice, includes a brix/acidity ratio of at least +/−10 percent when compared to the untreated form of the beverage, and the brix/acidity ratio of the treated beverage compared to the untreated from of the beverage, may be at least +/−20 percent. An exemplary acidity regulator for use with orange juices containing citric acid, to maintain the aforementioned brix/acidity rations is sodium citrate.

Another way to increase the Brix/ratio content in the finished juice or end-product is to remove organic acids from the juice. Removal of organic acids, for example citric acids, may be performed either by the aforementioned sugar receptors (of the first adsorbent 108 and/or the second adsorbent 116), or by different adsorbents having different receptors. These different receptors, with sensitivities for organic acids, may be mixed into the same carriers as the sugar receptors. The removal of the organic acids may be either simultaneous with the removal of the sugars (blocks 606, and 706 and 708, respectively), or sequential, either before or after, the sugar removal of blocks 606, and, 706 and 708, respectively.

Optionally, the pH of the portion of the juice undergoing the sugar-reduction process of blocks 606 (FIG. 6) and 706 and 708 (Portion A in FIG. 7), is increased either by a separate step (not shown), or simultaneously as part of the sugar-separation step of blocks 706 and 708, while the portion not undergoing the process (Portion B in FIG. 7) remains at constant pH.

Optionally, a pH increase to the beverage may be performed before the sugar separation step (blocks 606, or, 706 or 708) in order for the beverage to reach an optimal pH. This allows for sugar separation selectivity and/or kinetic and/or mass transfer during the sugar separation step of the process.

Optionally, the pH of the filtered beverage is increased relatively more than the Brix is reduced, so that the Brix/acidity ratio is increased.

Optionally, in FIG. 7, the pH of the portion undergoing the sugar-reduction process or treatment, i.e., Portion A, is increased to a pH of above 4.5, and the pH of the reduced sugar beverage at the end of the sugar-reduction process of blocks 706 and 708, the treated beverage 709, remains equal or below 4.5. Optionally, the pH of the reduced sugar beverage mix, of Portion A and Portion B, the end product of block 710, is in the pH range of approximately 3.5-4.5.

Optionally, in FIG. 7, the pH of the portion undergoing the sugar-reduction process or treatment, i.e., Portion A, is increased to a pH of above 5, and the pH of the reduced sugar beverage at the end of the sugar-reduction process of blocks 706 and 708, the treated beverage 709, remains equal or below 5. Optionally, the pH of the reduced sugar beverage mix, of Portion A and Portion B, the end product of block 710, is in the pH range of approximately 3.5-5.

Optionally, in FIG. 7, the pH of the portion undergoing the sugar-reduction process or treatment, i.e., Portion A, is increased to a pH of above 4, and the pH of the reduced sugar beverage at the end of the sugar-reduction process of blocks 706 and 708, the treated beverage 709, remains equal or below 5. Optionally, the pH of the reduced sugar beverage mix, of Portion A and Portion B, the end product of block 710, is in the pH range of approximately 3.5-4.

Optionally, the sugar removal process and the first adsorbent 108 and/or the second adsorbent 116 are designed so that they remove relatively more sucrose and less fructose (higher sweetening power). As a result, the sweetness of the end-product remains relatively higher as compared to treatments where all sugars are removed in the same proportions. For example, the sugar removal process is such that in the treated juice, the ratio of sucrose to total sugars may, for example range from approximately 10 percent sucrose/total sugars to approximately 30 percent sucrose/total sugars.

Additionally, the sugar removing process of FIGS. 6 and 7 are expected to dilute the beverage (i.e., juice). Accordingly, an optional concentration step may be performed on the beverage to be treated (FIG. 6) or the beverage portion to be treated (Portion A in FIG. 7), either prior to, or following, the sugar removing steps of blocks 606, and, 706 and 708, respectively. This concentration step results in the retrieval of the original juice concentration at the end of the process (except for sugar concentration). Alternately, the process of FIG. 6 and FIG. 7 may be integrated as part of the dilution of a juice concentrate intended to be diluted before bottling, or containerizing the juice.

Optionally, the end product or finished beverage or finished juice (of blocks 609 and 710) may be processed to improve the beverage nutritional profile or to add functions to it so it fits specific consumer requirements, for instance consumers before, during or after physical exercise or sport activities. Accordingly, minerals (for example, iron, calcium and/or sodium), proteins (from vegetable or animal origins), caffeine or probiotics may be added to the juice, following the sugar-removal step of blocks 606, and, 706 and 708, respectively, Optionally, when the beverage being treated is a juice, the sugar reduction process is such that following the solid(s) removal, e.g., pulp, removal process of blocks 602 and 702a, respectively, in addition to the pulp removal, additional filtration and/or centrifugation may be performed, to remove additional suspension material, which if unfiltered, may stick to the device (adsorbent 108 and/or the resin of the second adsorbent 116) containing the carrier, and/or the carrier causing the sugar separation to be less effective. The material removed from the aforementioned filtration processes may be added back to the juice at the end of the process, at any time after the sugar reduction steps of blocks 606, and, 706 and 708, respectively, have been performed, and, for example, to before the end product, e.g., the finished juice, is bottled or otherwise containerized.

Optionally, the process may include a step to separate/distillate the taste and flavor material from the juice before the sugar removal step(s) of blocks 606, and, 706 and 708, respectively. Any separated material may be added back to the juice at the end of the process, at any time after the sugar reduction of blocks 806 and 808, and after the end product is complete, at blocks 609 and 710, respectively, before the final bottling or containerizing.

Optionally, peel oil and/or natural fruit flavors and/or vitamins (i.e., Vitamins A and C) and/or minerals (i.e., Iron, Calcium) are added to the treated juice following sugar removal from the juice.

Alternately, in the case of juices being treated by the process of FIG. 6 or FIG. 7, the treated juice portion can be mixed with another portion of another or different juice. For example, with citrus juices, such as orange and grapefruit, it may be desired to lower acidity, for example to being the pH of the end product juice to over 4 or 4.5. For example, the treated citrus juice portion would be mixed with a portion of non-citrus juice, for example, mango or carrot juice. This mixture of juices would have lower acidity than pure citrus juice, e.g., orange juice and citrus juice. The mixed juice may be such that the volume rations are in the range of approximately 90 percent citrus juice and approximately 10 percent non-citrus juice, to mixtures of approximately 50 percent citrus juice and approximately 50 percent non-citrus juice.

EXAMPLES

Adsorbents
Zeolite:
Three Zeolite Y compositions having various Si/Al molar ratio were selected
1. Z-5:zeolite Y hydrogen powder with surface area of 730 m2/g and at $SiO_2:Al_2O_3$ molar ratio of 5.1:1. Alfa Aesar 45866
2. Z-30:zeolite Y hydrogen powder and with surface area of 780 m2/g and $SiO_2:Al_2O_3$ molar ratio of 30:1. Alfa Aesar 45870.
3. Z-80:zeolite Y hydrogen powder and with surface area of 780 m2/g and $SiO_2:Al_2O_3$ molar ratio of 80:1. Alfa Aesar 45866

Due to the hydrophobic nature of the sucrose interaction with the zeolite the content of negatively charged aluminum sites must have an influence on the adsorption.

Resin:
Four DOWEX 99Ca resins type uniform 220, 280, 310 and 350-μm particle size beads were tested in the resin adsorption experiments.

DOWEX MONOSPHERE™ 99 Ca Chromatography Resin is a uniform particle size, gel, strong acid cation resin, supplied in the Ca-form. The 220-μm particle size beads yield better separation, in difficult-to-separate and high value sweeteners, making it the premium resin for water use reduction and helping to reduce energy costs associated with evaporation.

DOWEX MONOSPHERE™ 99 Ca/320 chromatography resin is used for the separation of glucose and fructose in the production of high fructose corn syrup (HFCS) and high purity fructose.

DOWEX MONOSPHERE™ 99 K/350 chromatography resin is a uniform particle size, gel, strong acid cation resin, supplied in the K-form. Combining the extremely uniform 350-μm particle size beads and rapid kinetics, DOWEX MONOSPHERE 99 K/350 chromatography resin is designed for use in simulated moving bed (SMB) chromatographic separations to achieve separations with high recovery and high purity in the recovery of sucrose from molasses.

Sugar Solutions
Two aqueous solutions were selected to simulate the juice composition: orange juice from PRIGAT, and simulated sugars solution.

Analytical Method
The samples were analyzed for sugars and citric acid using HPLC
Column: Altech IOA-1000 organic acids length 300 nm
Eluent: 0.005N $H_2SO_4$ 0.4 ml/min 45° C.

Detector: RI

Figure 8:
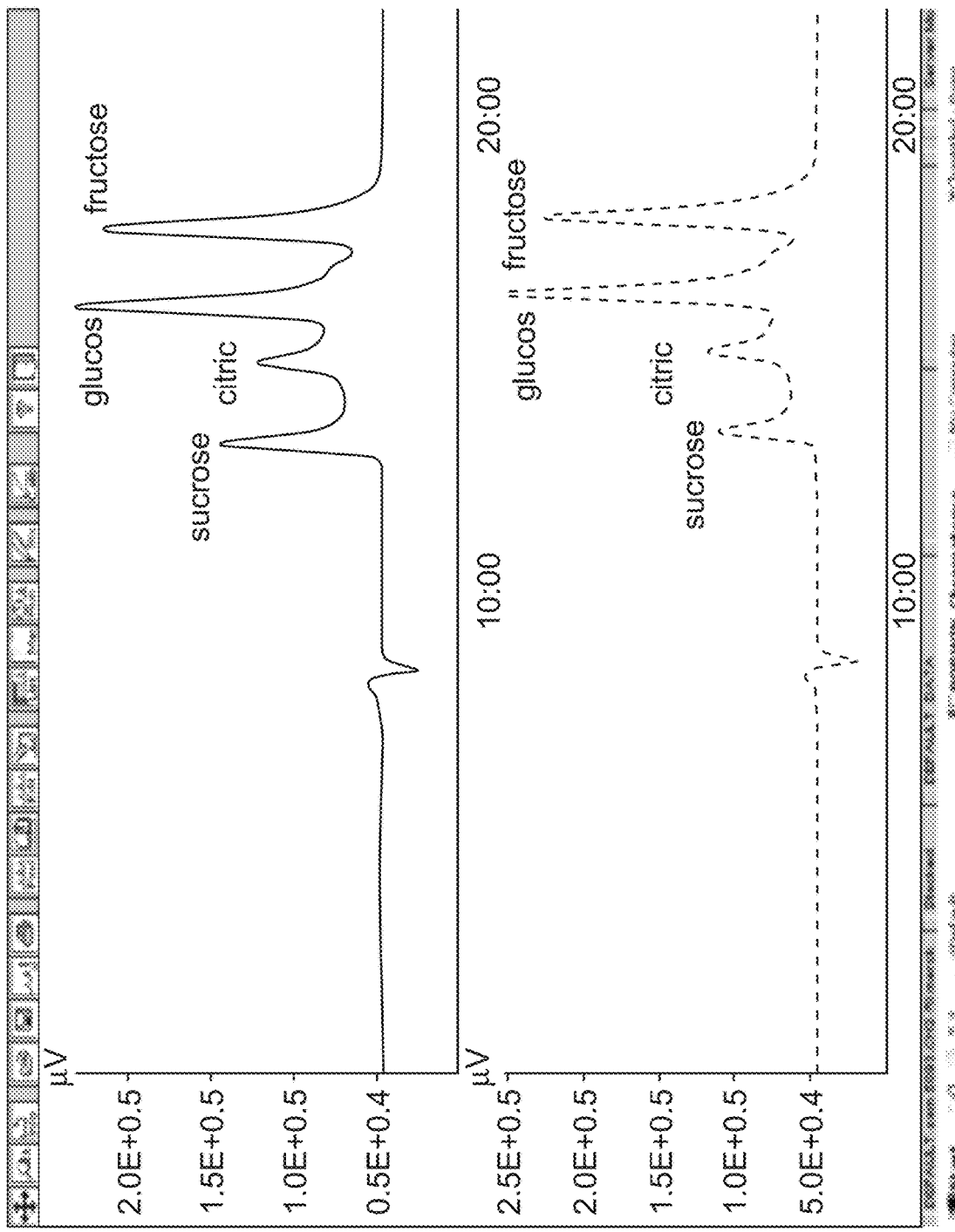
FIG. 8 is a diagram of a resonance image (RI) scan of orange juice before and after it was treated.

As shown in FIG. 8, the top portion of the figure represents orange juice before zeolite treatment, and the bottom portion represents orange juice after zeolite treatment.

Figure 9:
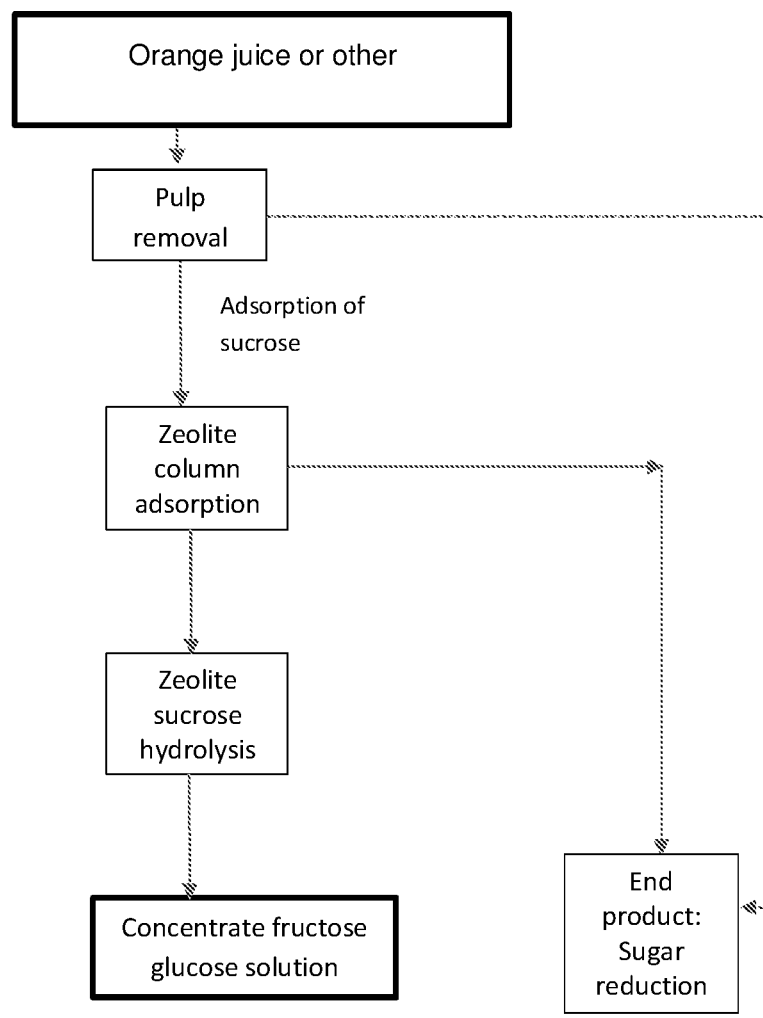
FIG. 9 is a flow diagram of a sugar removal process used in the EXAMPLES.

A schematic process flow diagram for the zeolite only is presented in FIG. 9, for removal of sugar from juice by zeolite (sucrose removal only).

Figure 10:
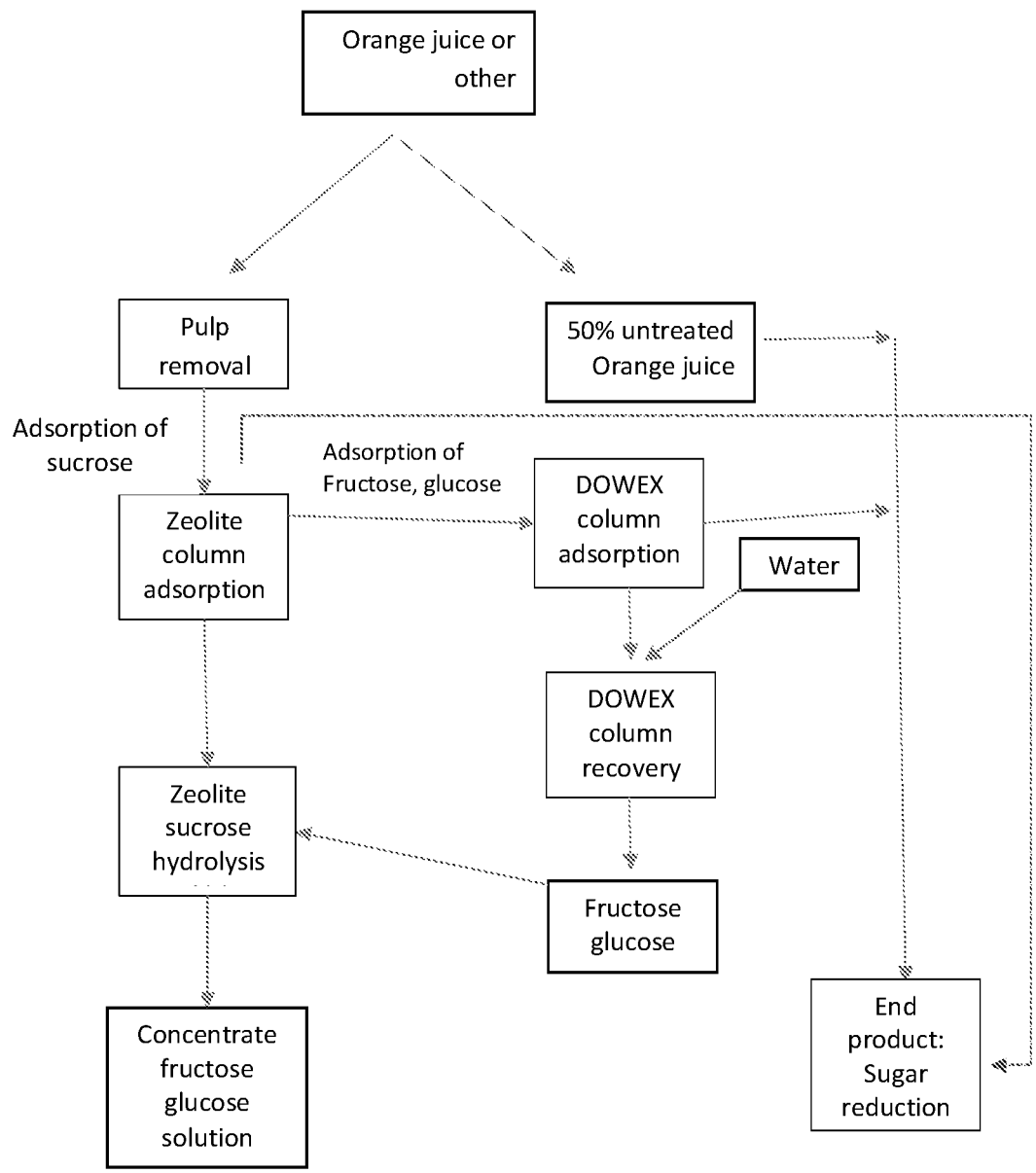
FIG. 10 is a flow diagram of another sugar removal process used in the EXAMPLES.

A schematic process flow diagram for the present design is presented in FIG. 10, the removal of sugar from juice by resin following zeolite treatment.

General Conclusions:

Zeolites:
- At Si/Al ratio of 30 or 80 the sucrose is adsorbed and adsorption is similar between 30 and 80.
- At Si/Al ratio of 5 there is negligible adsorption of sugars.
- The zeolites adsorbed mainly sucrose
- Citric, glucose and fructose are practically not adsorbed on the zeolite
- At Room Temperature (RT) there is no sucrose hydrolysis upon the zeolite
- At 60° C. the sucrose is hydrolyzed on the zeolite. This effect can be used to get good elution without addition of significant amount of water.
- Pulp precipitation occurs when Natural orange juice contacted with Zeolite. The result is a precipitate and clear orange juice solution.
- The sucrose capacity upon the Zaolite is 2.5% sucrose at sucrose in solution of 8% w/w.
- Zeolite can by coated with hydrogel while keeping its ability to absorb sucrose.

Resin (DOWEX 99)
- DOWEX 99Ca absorb fructose at higher efficiency compared to sucrose or glucose adsorption.
- The total sugar adsorption on DOWEX 99Ca/310 is better compared to the other resins (It is not significant)
- The capacity for DOWEX 99Ca at ~2.5% sucrose glucose and fructose in solution is
- ~1 wt % sucrose, ~1.5% glucose and 3.5% fructose In both cases, the pulp has to be separated before the adsorption on the Zeolite/resin. In an industrial process, it might be reinserted following sugar reduction, according the standard methods in the juice industry.

Part 1: Adsorption of Glucose Fructose and Sucrose and Citric Acid on Zeolites

Experiment 1: Adsorption of Sugars on Zeolites in Contact of Orange Juice with Y Zeolite H+, Na, K or Ca Cationic Form Procedure Materials: Orange juice, Z-5, Z-30

Zeolite Cation Exchange:

2 gr Zeolite (Z-5 or Z-30) and 10 gr NaOH, KOH or Calcium acetate (5 wt %) solution were introduced into vials and shaken for 2 hrs at RT. After centrifugation the supernatant was removed and new (same cation) solution was added. After 2 hrs of shaking the solution was separated by centrifugation and DI water were introduced into the vial. The zeolites were washed with DI water many times (~20 times) until the pH was almost 8. The zeolites were dried in the oven at 80° C. for 1 night.

0.2 gr of the resulting zeolite (wet volume 0.45 ml) Z-5 or Z-30 in H+, K or Na form and about 0.7 gr orange juice were introduced into vials. The vials were shaken at RT for 1 hr. Clear sample was taken for analysis by HPLC.

In all cases, the concentration of the various sugars upon the Zeolite was calculated by their concentration before and after contact in the aqueous phase.

TABLE 1 adsorption of sugars from orange juice on Zeolite Z-5 in H+ form or after cation exchange to Na, K or Ca

| Zeolite name | | | Solution composition | | | | Zeolite composition | | | |
|---|---|---|---|---|---|---|---|---|---|---|
| | | | sucrose wt % | Citric wt % | glucose wt % | fructose wt % | sucrose wt % | citric wt % | glucose wt % | fructose wt % |
| Original Juice | | | 3.05 | 0.65 | 1.97 | 2.1 | | | | |
| Z-5 H+ | 1 hr | RT | 3.24 | 0.75 | 2.51 | 2.43 | 0.55 | −0.37 | −1.59 | −0.98 |
| Z-5 Na | 1 hr | RT | 3.03 | 0.60 | 1.72 | 1.77 | 0.05 | 0.13 | 0.80 | 1.04 |
| Z-5 K | 1 hr | RT | 2.94 | 0.59 | 1.68 | 1.70 | 0.37 | 0.21 | 1.04 | 1.40 |
| Z-5 Ca | 1 hr | RT | 3.32 | 0.57 | 2.16 | 1.99 | −0.95 | 0.25 | −0.65 | 0.36 |
| Z-5 Na | 1 hr | RT | 3.18 | 0.73 | 2.42 | 2.39 | −0.48 | −0.31 | −1.59 | −1.06 |
| Z-5 Ca | 1 hr | RT | 3.16 | 0.69 | 2.32 | 2.24 | −0.41 | −0.15 | −1.25 | −0.51 |
| Z-30 H+ | 1 hr | RT | 1.68 | 0.57 | 2.14 | 2.26 | 5.02 | 0.29 | −0.6 | −0.61 |
| Z-30 Na | 1 hr | RT | 3.18 | 0.63 | 2.08 | 2.15 | −0.52 | 0.06 | −0.41 | −0.21 |
| Z-30 K | 1 hr | RT | 3.08 | 0.72 | 2.04 | 2.18 | −0.12 | −0.28 | −0.24 | −0.31 |
| Z-30 Ca | 1 hr | RT | 1.99 | 0.61 | 2.11 | 1.96 | 4.05 | 0.14 | −0.54 | 0.50 |
| Z-30 Ca | 1 hr | RT | 2.04 | 0.57 | 2.21 | 2.20 | 3.78 | 0.28 | −0.92 | −0.39 |

Conclusions
    Zeolite Z-5 did not adsorbed sucrose, citric, glucose and fructose in all of the cationic forms (H+, Na, K or Ca).
    Zeolite Z-30 did not adsorbed sucrose, citric, glucose and fructose in Na or K cationic forms.
    Zeolite Z-30 adsorbed sucrose when at Ca or H+ form Experiment 2: Adsorption of Sucrose Glucose or Fructose at Various Concentrations Upon Zeolite Z-30 H+ Form in Contact with Synthetic Solution, at RT or 60° C.

Procedure 0.2 gr zeolite Z-30 at H+ form, 0.7-0.1 gr synthetic solution of sucrose glucose and fructose and 0-0.8 gr water were introduced into vials. The vials were shaken at RT or 60° C. for 1 hrs.

TABLE 2 adsorption of sugars from synthetic solution on Zeolite Z-30 in H+ form at various initial concentration.

| Zeolite name | | Solution composition | | | Zeolite composition | | |
|---|---|---|---|---|---|---|---|
| | | sucrose wt % | glucose wt % | fructose wt % | sucrose wt % | glucose wt % | fructose wt % |
| Z-30 H+ | 1 hr RT | 2.84 | 3.92 | 3.67 | 8.35 | 1.78 | 1.07 |
| Z-30 H+ | 1 hr RT | 1.71 | 2.71 | 2.73 | 6.60 | 1.41 | 0.27 |
| Z-30 H+ | 1 hr RT | 1.08 | 1.82 | 1.77 | 2.39 | 0.30 | −0.19 |
| Z-30 H+ | 1 hr RT | 0.53 | 1.09 | 1.00 | 1.97 | 0.24 | 0.13 |
| Z-30 H+ | 1 hr RT | 0.32 | 0.64 | 0.60 | 1.05 | −0.19 | −0.32 |
| Z-30 H+ | 1 hr RT | 4.00 | 5.31 | 5.21 | 5.69 | −4.21 | −5.86 |
| Z-30 H+ | 1 hr 60 C. | 1.57 | 6.47 | 6.33 | 14.12 | −7.98 | −9.18 |
| Z-30 H+ | 1 hr 60 C. | 0.88 | 3.60 | 3.73 | 9.95 | −5.36 | −7.20 |
| Z-30 H+ | 1 hr 60 C. | 0.49 | 2.44 | 2.37 | 6.22 | −4.12 | −4.52 |
| Z-30 H+ | 1 hr 60 C. | 0.29 | 1.95 | 1.91 | 4.46 | −3.93 | −4.25 |

The distribution of each sugar between the two phases was calculated by dividing each one's equilibrium concentration in the Zeolite phase by its equilibrium concentration in solution.

TABLE 3

| | Distribution at Equilibrium state | | |
|---|---|---|---|
| Zeolite name | sucrose kd | glucose kd | fructose kd |
| Z-30 H+ | 2.9 | 0.45 | 0.29 |
| Z-30 H+ | 3.9 | 0.52 | 0.10 |
| Z-30 H+ | 2.2 | 0.17 | −0.11 |
| Z-30 H+ | 3.7 | 0.22 | 0.13 |
| Z-30 H+ | 3.2 | −0.31 | −0.53 |
| Z-30 H+ | 1.4 | −0.79 | −1.12 |
| Z-30 H+ | 9.0 | −1.23 | −1.45 |

TABLE 3-continued

| | Distribution at Equilibrium state | | |
|---|---|---|---|
| Zeolite name | sucrose kd | glucose kd | fructose kd |
| Z-30 H+ | 11.4 | −1.49 | −1.93 |
| Z-30 H+ | 12.7 | −1.69 | −1.91 |
| Z-30 H+ | 15.6 | −2.01 | −2.22 |

Experiment 3: Adsorption of Sucrose on Zeolite Z-30 H+ or Ca Form from Sucrose Solution at Room Temperature (RT)

Procedure 0.2 gr zeolite Z-30 at H+ or Ca form, 0.7-0.11 gr sucrose solution (7.6 wt %) and 0-0.6 gr water were introduced into vials. The vials were shaken at RT for 1 hr. clear samples were taken for analysis by High Performance Liquid Chromatography (HPLC).

TABLE 4 sucrose adsorption from synthetic solution on Zeolite Z-30 in H+ form or Ca form

| Zeolite name | Solution composition at equilibrium sucrose wt % | Sucrose concentration on the zeolite (calculated) sucrose wt % | sucrose Distribution coefficient |
|---|---|---|---|
| Z-30 Ca 1 hr RT | 5.28 | 8.10 | 1.5 |
| Z-30 Ca 1 hr RT | 2.43 | 6.08 | 2.5 |
| Z-30 Ca 1 hr RT | 0.93 | 4.51 | 4.9 |
| Z-30 Ca 1 hr RT | 0.42 | 3.05 | 7.3 |
| Z-30 H+ 1 hr RT | 1.57 | 8.59 | 5.5 |

Figure 11:
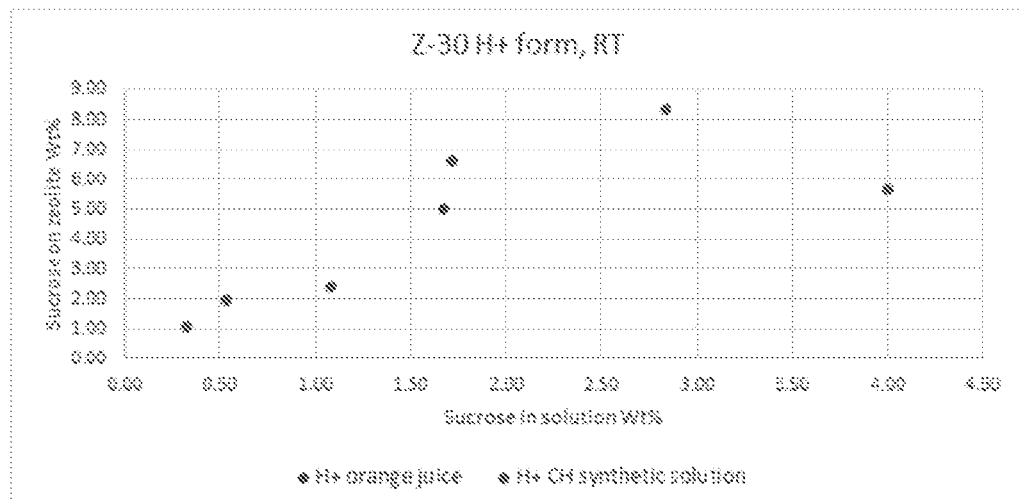
FIG. 11 is a diagram of the adsorption of sucrose from orange juice or from synthetic solution on Z-30 H+ form Zeolite.

FIG. 11 shows adsorption of sucrose from orange juice or from synthetic solution on Z-30 H+ form.

Figure 12:
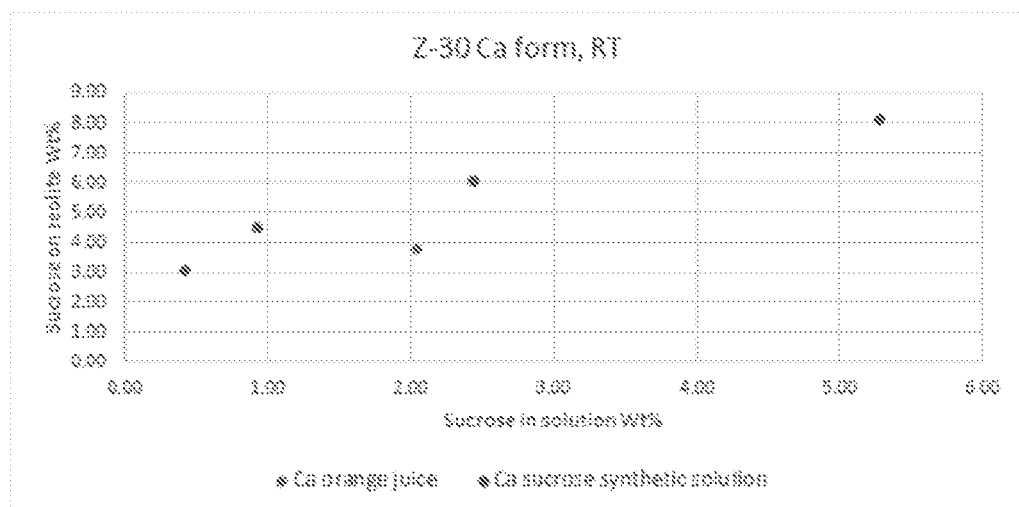
FIG. 12 is a diagram of the adsorption of sucrose from orange juice or from synthetic solution on Z-30 Ca++ form Zeolite.

FIG. 12 shows adsorption of sucrose from orange juice or from synthetic solutions on Z-30 $Ca^{++}$ form.

Experiment 4: Sucrose Hydrolysis on Z-30 at RT and 60° C.

Procedure 0.2 gr zeolite Z-30 in H+ or Ca form, 0.7-0.3 gr sucrose 5.5 wt % solution and 0-0.3 gr water were introduced into vials. The vials were shaken at RT or 60° C. for 1 hr. Samples from the liquid phase were removed for analysis.

TABLE 5 hydrolysis of sucrose to glucose and fructose on Z-30H+

| Zeolite name | sucrose Wt % | | sucrose wt % | glucose wt % | fructose wt % | Fraction of hydrolyzed Sucrose* |
|---|---|---|---|---|---|---|
| Z-30 H+ | 5.58 | 1 hr RT | 3.3 | 0.00 | 0.00 | 0 |
| Z-30 H+ | 2.88 | 1 hr RT | 1.1 | 0.00 | 0.00 | 0 |
| Z-30 H+ | 5.58 | 1 hr 60° C. | 1.7 | 1.49 | 1.43 | 0.52 |
| Z-30 H+ | 2.72 | 1 hr 60° C. | 0.7 | 0.92 | 0.90 | 0.67 |

*the fraction of hydrolyzed sucrose was calculated from the glucose and the fructose concentration divided by the sucrose initial concentration Conclusions The sucrose is not hydrolyzed at RT in the presence of Z-30-H+

The sucrose is hydrolyzed at 60° C. in the presence of Z-30-H+

Experiment 5: Adsorption Curves of Sucrose Between Zeolite Z-80 H+ or Ca Form Sucrose Solution at RT Procedure:

0.2 gr zeolite Z-80 in H+ form, 0.7-0.11 gr sucrose 5.1 wt % solution and 0-0.6 gr water were introduced into vials. The vials were shaken at RT for 1 hr. Samples from the aqueous phase were removed for analysis.

TABLE 6 sucrose adsorption from synthetic solution on Zeolite Z-30 in H+ form

| Zeolite name | | Solution composition in equilibrium sucrose wt % | Zeolite composition sucrose wt % |
|---|---|---|---|
| Z-80 H+ | 1 hr RT | 3.1 | 7.19 |
| Z-80 H+ | 1 hr RT | 2.0 | 4.74 |
| Z-80 H+ | 1 hr RT | 1.2 | 2.02 |
| Z-80 H+ | 1 night RT | 0.7 | 1.00 |

Figure 13:
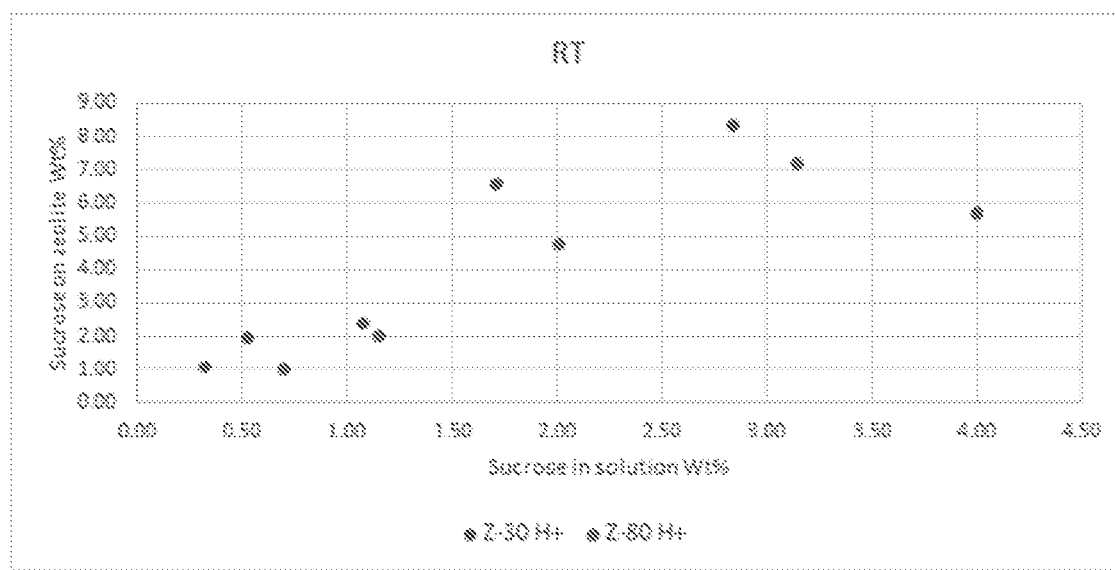
FIG. 13 is a diagram of the adsorption of sucrose from orange juice or from synthetic solution on Z-30 or Z-80 H+ form Zeolite.

In all of the experiments presented in Table 5 NO Fructose or Glucose were founded, from the results one can see that there is no hydrolysis of Sucrose at RT FIG. 13 shows adsorption of sucrose from synthetic solution upon Z-30 or Z-80 on H+ form.

Conclusions

Z-80 and Z-30 adsorbed sucrose in H+ form from sucrose solution at close to similar proportions After 1 night at RT there is no hydrolysis of sucrose with Z-80

Zeolite in Column

The zeolite that was used comes as fine powder. Construction of column comprising the powder is problematic because the passage of liquid through is very slow and not uniform. Zeolite powder was encapsulated in hydrogel. Initial tests with column based on zeolite beads coated with hydrogel showed good liquid flow.

Experimental:

Materials:

Alginic acid sodium salt (sigma 180947).

Calcium chlorides (CaCl2), were purchased from Sigma as well.

Synthesis of Zeolite Mix and Encapsulation in Alginate Beads

1—Preparation of the Solution

Aqueous sodium alginate was prepared by dissolving 2% (wt/v) sodium alginate water. The suspension was mixed at 60° C. under continuous magnetic stirring at ~2000 rpm for 5 hrs. 7 gr of Z-80-1 zeolite was added slowly into a vial comprising 14 gr of 2% Alginate solution.

The suspension was stirred with mechanical stirring to get a homogenous high viscosity suspension.

Solution of 2% CaCl$_2$ was prepared by addition of 2 gr CaCl$_2$ into 98 ml water at 40° C. under continuous stirring for 2 hrs.

TABLE 7

Preparation of Zeolite in alginate solution

| TZ-01 | | | |
|---|---|---|---|
| Alginic acid 2% sodium salt(sigma 180947) gr | zeolite 80:1 gr | | CaCl$_2$ 2% |
| 14 | 7 | dispersion and dropping into the CaCl$_2$ solution | 10 |

2—Preparation of Beads

The resulting liquid suspension (Zeolite/alginate) were transferred into a syringe and was added dropwise into calcium chloride solution (2%).

Figure 14:
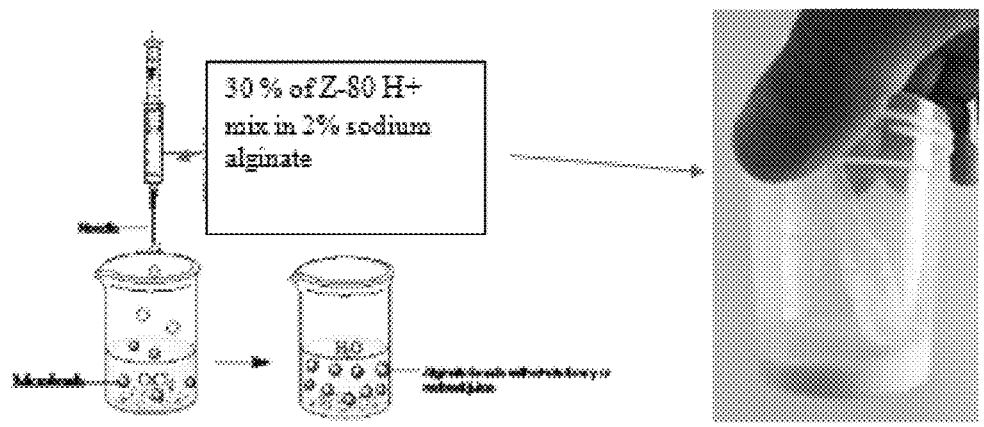
FIG. 14 is a drawing of the preparation of zeolite/alginate.

FIG. 14 shows preparation of zeolite/alginate.

Results:

Two types of experiments were performed, the first in batch and the second with Column (with two bead sizes)

Experiment 6: Adsorption of Sugars Upon Zeolite Encapsulated in Ca-Alginate Beads Sugars adsorption test was done by mixing 0.64 gr of zeolite Y80-1 beads (having about 2 mm diameter) with 1.08 gr sugars synthetic solution in 1.5 ml Eppendorf, the mixture was shaken for 1 hr at RT.

TABLE 8

Adsorption of sugars upon encapsulated Zeolite

| | Solution Composition | | | Zeolite Composition |
|---|---|---|---|---|
| | sucrose wt % | glucose wt % | fructose wt % | sucrose wt % |
| Initial sugars Synthetic Solution | 2.01 | 1.71 | 1.78 | |
| Sugar solution in equilibrium after adsorption | 1.17 | 1.41 | 1.34 | 1.63 |

Due to water release from Hydrogel into the sugar solution, the sugar solution is actually diluted, so the calculation of the sucrose concentration was carried out by normalization of the concentration of fructose and glucose in the solution. We worked under the assumption that fructose and the glucose did not adsorb upon the zeolite (as found in our previous research).

Figure 15:
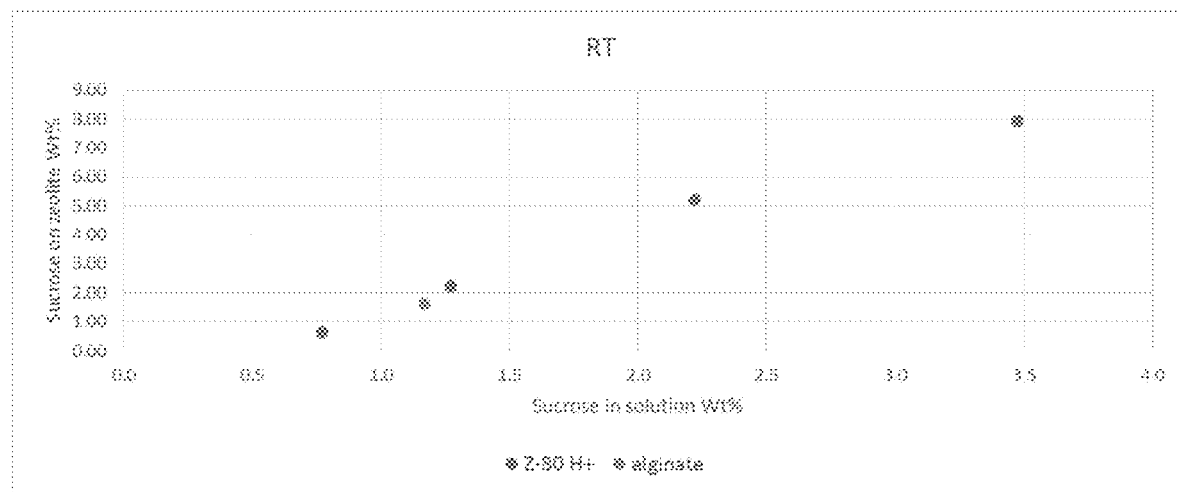
FIG. 15 is a diagram of adsorption of sugars on zeolite beads in a batch test.

FIG. 15 shows adsorption of sugars on zeolite beads in batch tests. As can be seen in FIG. 15, the adsorption of sucrose on zeolite beads falls at the point in the graph fit to adsorption using zeolite powder.

Conclusion:

Zeolite Coating by Alginate and formation of Zeolite hydrogel beads did not block the surface area of the zeolite and allows sucrose adsorption.

Experiment 6A: Adsorption of Sugars Upon Zeolite Encapsulated in Ca-Alginate Beads Construction of Column Comprising Zeolite Beads.

FIG. 16 shows large zeolite beads (A) vs. small beads (B) in a packed column.

FIG. 16, at A: Large beads of zeolite during transfer of orange juice, due to the high free volume between the big beads, a significant amount of the fluid passes through the void volume and not through the zeolite hydrogel.

FIG. 16 at B: the hydrogel beads polymerization process is made inside the column so the open spaces (void volume) between the particles to the beads are much smaller.

It was decided to continue the work using medium size zeolite/alginate beads, in order to increase the contact time between the sugars solution and the beads we used a reverse flow method, the solution was inject from the bottom of the column.

Column Preparation Procedure:
1. Preparing a mixture of 14 gr 2% alginate solution with 7 gr of Y80-1 zeolite was made
2. Addition of 7 ml $CaCl_2$ 2% solution into the test tube.
3. Adding the zeolite suspension, dropwise, into calcium chloride solution
4. The beads were left for one hour and the zeolite/calcium alginate and were harvested by filtration
5. The residual Ca salt was washed with about 10 ml water.
6. The beads were dried with air in order to remove the excess of water
7. The column was packed.

Figure 17A:
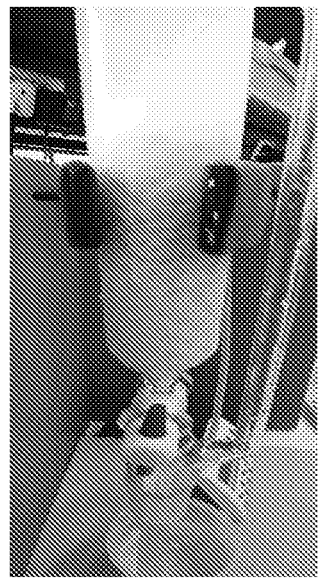
FIG. 17A is a photograph showing Zeolite alginate beads in a column.

FIG. 17A shows a Zeolite alginate beads column.

Procedure:

Referring to FIG. 17A, the column was filled with water, than 1 ml of synthetic sugar solution added into column, by injection from 10 ml syringe, to the bottom of the column. Samples were collected from the top of the column.

Figure 17B:
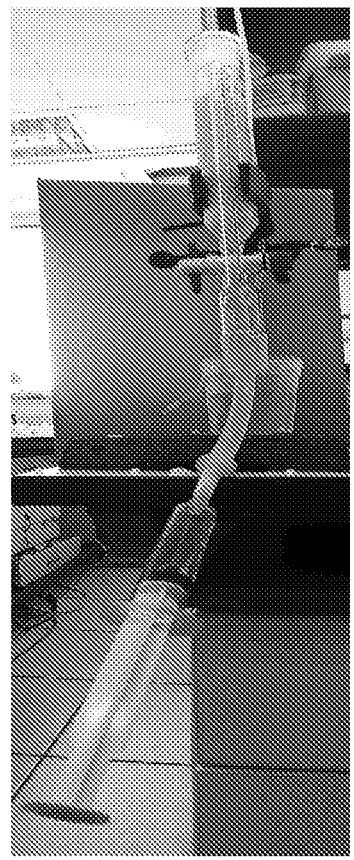
FIG. 17B is a photograph showing injection of sugar solution into the column of FIG. 17A.

Every 5 minutes 1 ml of sugar solution was inject as showed in FIG. 17B.

FIG. 17B shows injection of sugar solution into the column.

Figure 18:
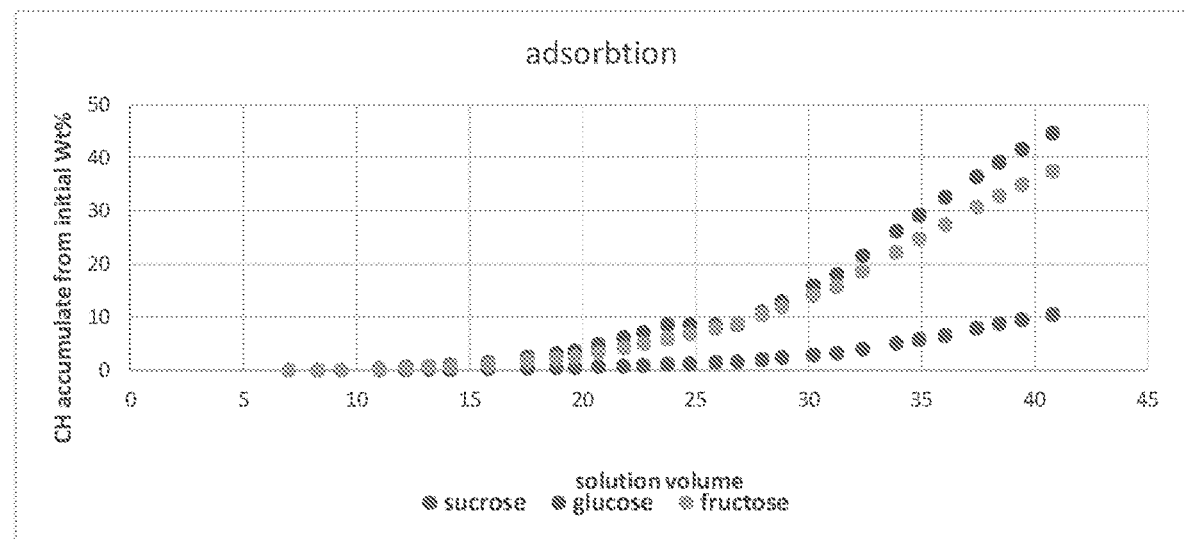
FIG. 18 is a diagram showing accumulative adsorption onto the column of FIG. 17A.

Results:

FIG. 18 shows the flow of sugars through the column as a function of volume of injected solution, or accumulative adsorption of sugars upon the column. A Total 40 ml of sugars solution was injected and on was followed by water injection.

The results presented in FIG. 18 show that the sucrose is absorbed upon the zeolite beads during the process, while fructose and glucose are absorbed at a lower amount.

The void volume of the column is 40 ml so the amount of sugars that was inject in to the column is not sufficient in order to defined the zeolite sugar capacity, moreover the column length was too short so the sucrose absorption efficiency was ~88% and not 100% as was at batch experiment.

For the next steps, a larger column should be used so as to pass through it a larger amount of sugar solution in order to demonstrate the process.

Elution Process:

The zeolite beads column, after the sugar absorption, was introduced into the oven at 60° C. for 2 hours to induce hydrolysis. Since the other sugars are bound to the zeolite much weaker than sucrose it is easier to release them, than sucrose from the column after the hydrolysis.

After two hours at oven the column was washed with small portions of fresh water (the same way as in the loading step). The results are presented in FIG. 19, elution of sugars after sucrose hydrolysis.

Figure 19:
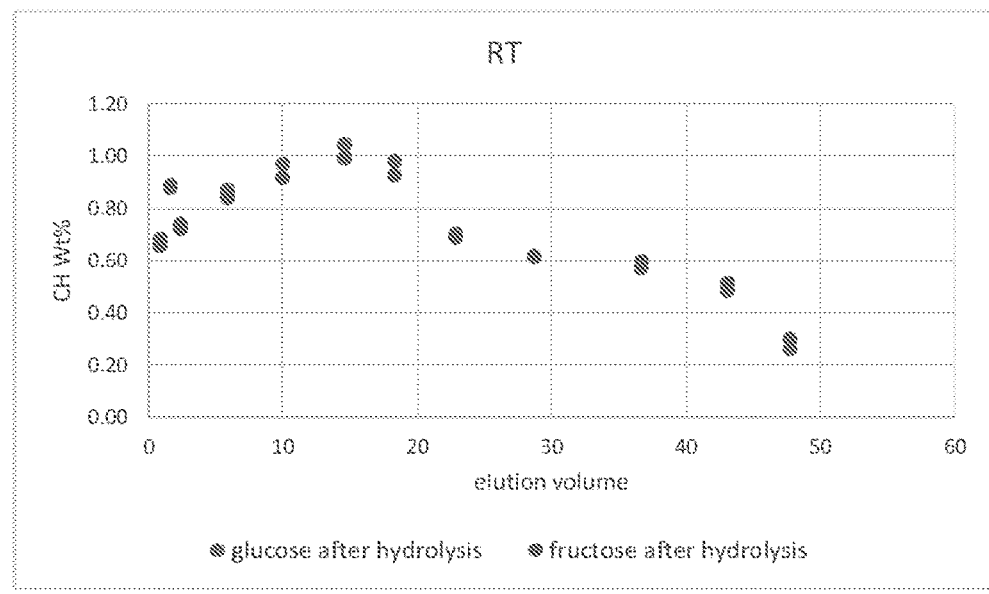
FIG. 19 is a diagram showing elution of sugars after sucrose hydrolysis on the column of FIG. 17A.

In FIG. 19, the results show that all the sucrose has hydrolyzed and that it is possible to wash out glucose and fructose with water in order to remove the sugars from the column.

Adsorption of glucose, fructose, sucrose and citric acid on DOWEX 99

Experiment 7: Adsorption of Sugars Upon Various Types of DOWEX 99 Calcium Form from Sugar Enriched Orange Juice Procedure Enriched orange juice: 32.5 gr (after filtration with 0.45 micron filter) orange juice+1.4 gr sucrose+1.4 gr glucose+1.4 gr fructose 6.2 gr resin and 4.5 gr enriched orange juice were added into vials. The vials were kept under vacuum for 1 night, then, the vials were shaken at RT for 1 hr.

TABLE 9 sucrose glucose and fructose adsorption from orange juice enriched solution on DOWEX 99 (Ca form)

| resin name | Solution composition | | | | | Resin composition | | | |
|---|---|---|---|---|---|---|---|---|---|
| | sucrose wt % | citric wt % | glucose wt % | fructose wt % | pH | sucrose wt % | citric wt % | glucose wt % | fructose wt % |
| | 3.46 | 0.43 | 4.95 | 5.05 | | | | | |
| 220 Ca | 2.18 | 0.23 | 3.21 | 2.30 | 3.73 | 1.58 | 0.25 | 2.13 | 3.38 |
| 280 Ca | 3.97 | 0.23 | 4.12 | 2.08 | 4.34 | −0.69 | 0.27 | 1.12 | 4.06 |
| 310 Ca | 2.49 | 0.22 | 3.34 | 2.42 | 3.7 | 1.31 | 0.29 | 2.17 | 3.56 |
| 350 Ca | 2.91 | 0.50 | 3.50 | 3.08 | 4.27 | 0.84 | −0.11 | 2.19 | 2.99 |

| resin name | sucrose K | glucose K | fructose K |
|---|---|---|---|
| 220 Ca | 0.73 | 0.66 | 1.5 |
| 280 Ca | −0.17 | 0.27 | 2.0 |
| 310 Ca | 0.53 | 0.65 | 1.5 |
| 350 Ca | 0.29 | 0.63 | 1.0 |

Figure 20:
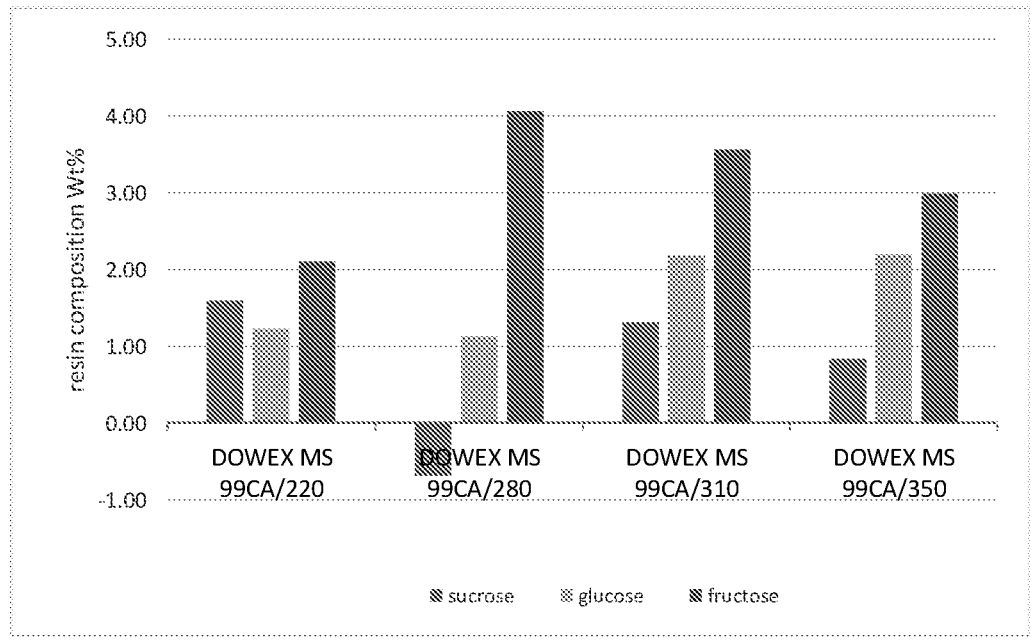
FIG. 20 shows a diagram of adsorption of sugars from enriched orange juice solution on DOWEX™ Resins.

FIG. 20 shows adsorption of sugars from enriched orange juice solution on DOWEX 99 Ca form.

Conclusions:

The fructose adsorption is much better than the glucose and sucrose.

The total sugar adsorption of DOWEX 99Ca/310 is better than that of the others resins.

Experiment 8: Adsorption of Sugars Upon DOWEX 99 (Calcium) after Cation Exchange from Enriched Orange Juice The orange juice: Prigat classic Orange juice:
Enriched orange juice: 32.5 gr 0.45 micron filtered orange juice+1.4 gr sucrose+1.4 gr glucose+1.4 gr fructose
Resin Cation Exchange
2 gr resin (DOWEX MS 99CA 220-350) and 10 gr HCl37% were introduced into vials.

1—The vials were shaken 2 hrs at RT.
2—The vials were centrifuged and the clear solution was removed. A new HCl solution portions were added into solids residues.
3—The vials were shaken for 2 hrs.
4—The vials were centrifuged and the clear solution was removed.
5—The resins were washed with water many times aided by centrifugation.
6—After centrifugation NaOH solution was added and the vials were shaken for 2 hrs at RT, this process was repeated for additional two times.
7—The vials were shaken for 2 hrs and the solutions were removed and water were added.
8—The resins were washed with water many times until the pH was almost 8
9—The resins were dried in the oven at 65° C. for 1 night.

Sugar Adsorption 6.2 gr resin after cation exchange and 4.5 gr enriched orange juice were and 1.5 ml water introduced into vials. The vials were put under vacuum for 1 night. The vials were shaken at RT for 1 hr

TABLE 10 sucrose glucose and fructose adsorption from orange juice enriched solution on Dowex 99 in Na form

| | Solution | | | | | Resin | | | |
|---|---|---|---|---|---|---|---|---|---|
| resin name | sucrose wt % | citric wt % | glucose wt % | fructose wt % | pH | sucrose wt % | citric wt % | glucose wt % | fructose wt % |
| 220 Na | 2.96 | 0.45 | 3.70 | 3.22 | | −1.63 | −0.38 | −1.21 | −0.05 |
| 280 Na | 2.91 | 0.44 | 3.66 | 3.06 | 4.37 | −1.69 | −0.39 | −1.36 | 0.06 |
| 310 Na | 1.39 | 0.23 | 3.70 | 3.26 | 2.53 | 2.41 | 0.15 | −1.07 | 0.26 |

Conclusions:

There is no significant adsorption of sugars on the DOWEX resin after cation exchange to Na-form.

Experiment 9: Sugars Adsorption on DOWEX 99 Calcium Form from Synthetic Sugars Solution Procedure 6.2 gr resin after cation exchange and 4.5 gr synthetic solution were introduced into vials. The vials were kept under vacuum for 1 night. The vials were shaken at RT for 1 hr

TABLE 11 sucrose glucose and fructose adsorption from synthetic solution on DOWEX 99 in Ca form

| | Solution composition | | | | Resin composition | | | distribution coefficient | | |
|---|---|---|---|---|---|---|---|---|---|---|
| resin name | sucrose wt % | glucose wt % | fructose wt % | pH | sucrose wt % | glucose wt % | fructose wt % | sucrose K | glucose K | Fructose K |
| | 1.54 | 2.33 | 2.16 | | | | | | | |
| 220 Ca | 1.40 | 1.74 | 1.34 | 6.74 | 0.17 | 0.71 | 0.98 | 0.13 | 0.41 | 0.74 |
| 280 Ca | 1.54 | 2.27 | 1.76 | 7.07 | 0.00 | 0.09 | 0.65 | 0.02 | 0.05 | 0.39 |
| 310 Ca | 1.23 | 1.63 | 1.15 | 6.82 | 0.47 | 1.02 | 1.48 | 0.40 | 0.64 | 1.30 |
| 350 Ca | 1.48 | 1.85 | 1.53 | 7.22 | 0.09 | 0.69 | 0.90 | 0.06 | 0.37 | 0.59 |

Conclusions:

The fructose adsorption is much better than that of the glucose and sucrose.

The 310 DOWEX 99Ca resin have the best adsorption properties.

Comparison between Zeolite or DOWEX 99 (Ca) resins type 310-µm particle

Figure 21:
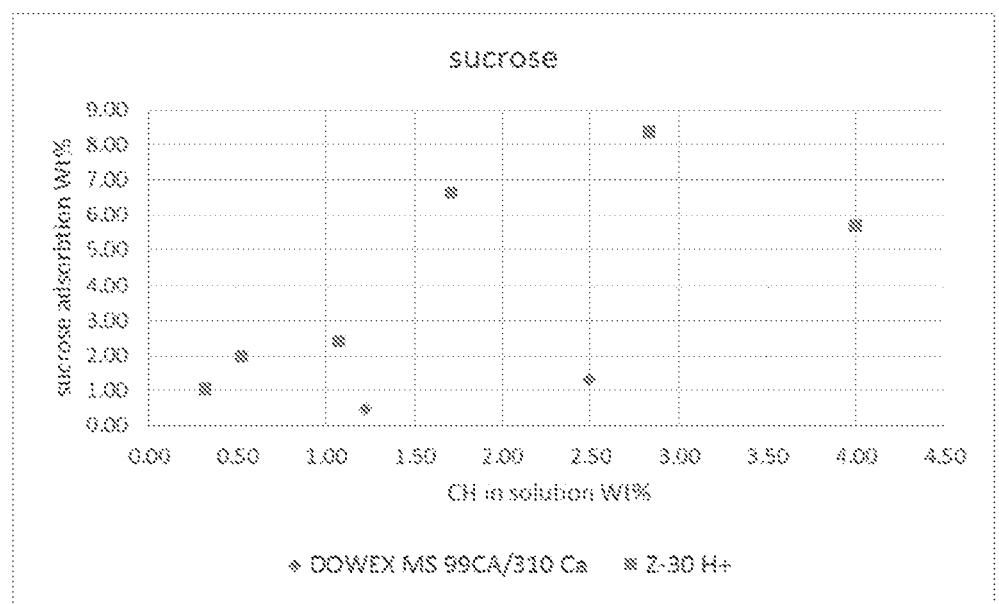
FIG. 21 is a diagram showing sucrose adsorption on Zeolites and Resins.
Figure 22:
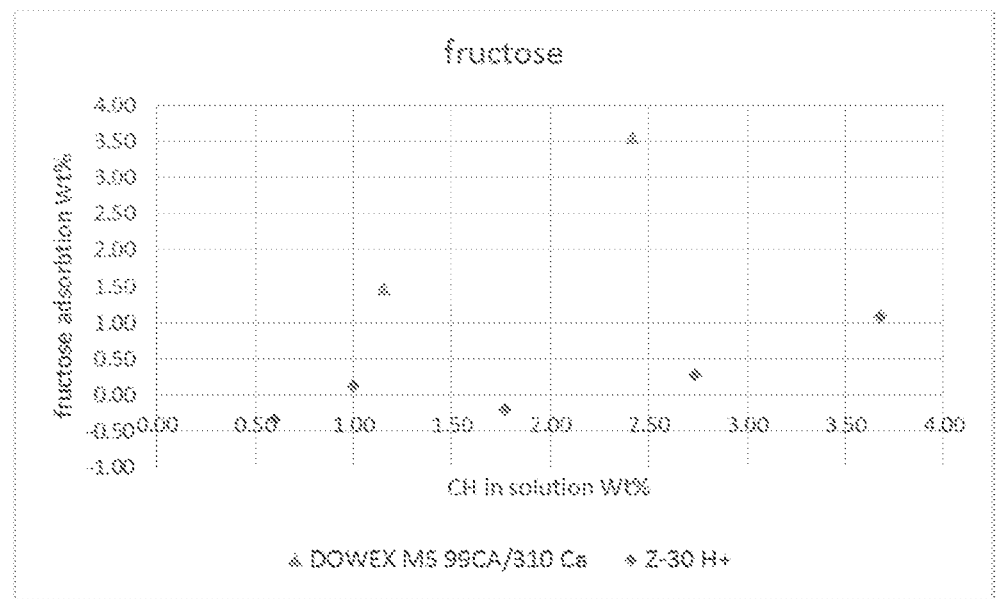
FIG. 22 is a diagram showing Fructose adsorption on Zeolites and Resins.
Figure 23:
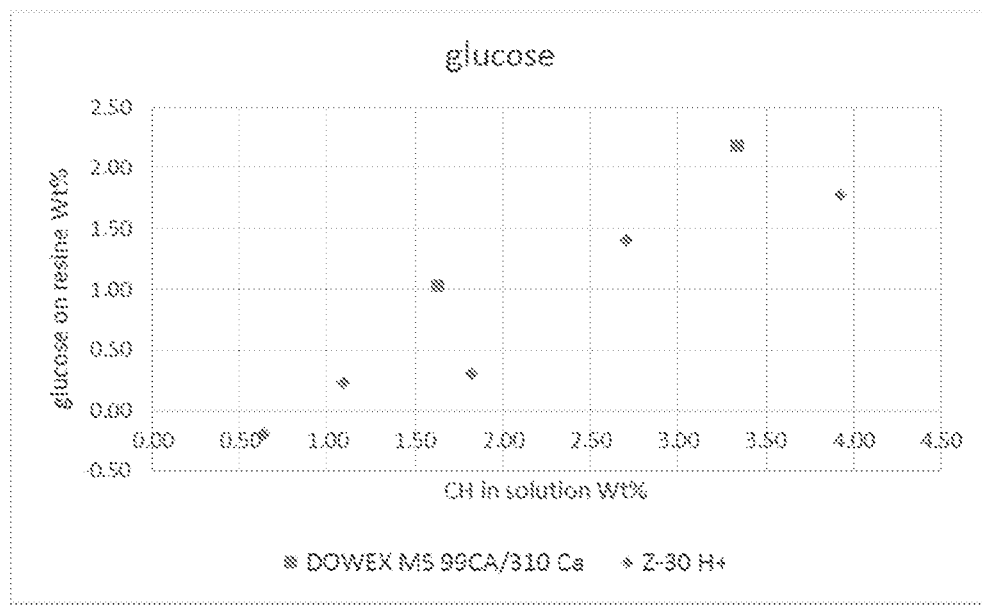
FIG. 23 is a diagram showing Glucose adsorption on Zeolites and Resins.

In order to compare between sugars adsorption in zeolite vs. resin, we compared them together at the similar sugars in solution values, in as shown in FIGS. 21, 22 and 23.

FIG. 21 shows sucrose adsorption on Zeolite or on DOWEX 99 (Ca form).

FIG. 22 shows Fructose adsorption on Zeolite or on DOWEX 99 (Ca form).

FIG. 23 shows Glucose adsorption on Zeolite or on DOWEX 99 (Ca form).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of lowering the disaccharide content of a fruit juice, the method comprising:
   (a) separating at least part of solid components from the juice;
   (b) contacting a first adsorbent with the juice resulting from said step (a), the first adsorbent being a Y zeolite that is active so as to have a higher relative selectivity for disaccharides than for monosaccharides and organic acids, to treat the juice and obtain a treated juice having at least 30% less sugar than the untreated form of the juice and a ratio of disaccharides to total sugars below at least 30 percent, wherein the Y zeolite has a Si/Al molar ratio of at least about 10:1;
   (c) regenerating the first adsorbent after said contacting step by washing said first adsorbant with water or a mixture consisting of water and at least one of fructose and glucose; and
   (d) repeating said step (b) using the regenerated first absorbent.

2. The method of claim 1, wherein a Brix/acidity ratio of the treated juice is decreased to be less than about 20%, when compared to the untreated form of the juice.

3. The method of claim 1, wherein the first adsorbent is in a column.

4. The method of claim 1, wherein the Y zeolite has a Si/Al molar ratio of at least about 10:1 and up to about 30:1.

5. The method of claim 1, wherein the Y zeolite is at least one of: Y Zeolite $H^+$, and Y Zeolite Ca.

6. The method of claim 1, wherein the first adsorbent is associated with a carrier, wherein the carrier is selected from beads, granules, fibers, tubes, high-porosity scaffold, and combinations thereof.

7. The method of claim 6, wherein the beads are of approximately 0.1 millimeter to approximately 15 millimeters in diameter and/or comprise pores of approximately 0.1 micrometers ($\mu m$) to approximately 100 $\mu m$ in diameter.

8. The method of claim 6, wherein the beads comprise a food grade material comprising at least one of hydrogels, organic resins, glass, polymers, carbons, and ceramics.

9. The method of claim 6, wherein the surface of the beads, fibers and/or tubes is coated with a zeolite powder.

10. The method of claim 1, wherein the separating of the solid components from the beverage comprises at least one of: centrifugation or filtration.

11. The method of claim 1, wherein the juice comprises at least one of orange juice and grapefruit juice.

* * * * *